United States Patent
Yabuki et al.

(10) Patent No.: US 7,279,033 B2
(45) Date of Patent: *Oct. 9, 2007

(54) INK JET AND INK JET RECORDING METHOD

(75) Inventors: Yoshiharu Yabuki, Minami-Ashigara (JP); Toshiki Taguchi, Tokyo (JP); Makoto Suzuki, Asaka (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 194 days.

This patent is subject to a terminal disclaimer.

(21) Appl. No.: 10/936,548

(22) Filed: Sep. 9, 2004

(65) Prior Publication Data

US 2005/0109236 A1    May 26, 2005

(30) Foreign Application Priority Data

Sep. 9, 2003 (JP) .......................... P.2003-316792
Sep. 7, 2004 (JP) .......................... P.2004-259699

(51) Int. Cl.
    C09D 11/02       (2006.01)
(52) U.S. Cl. .............................. 106/31.47; 106/31.49; 106/31.51; 106/31.52; 106/31.77; 106/31.78; 106/31.8; 106/31.81
(58) Field of Classification Search ............ 106/31.27, 106/31.6, 31.49, 31.78, 31.47, 31.77, 31.51, 106/31.8, 31.52, 31.81
    See application file for complete search history.

(56) References Cited

U.S. PATENT DOCUMENTS

| 7,052,535 B2 * | 5/2006 | Uhlir-Tsang et al. .... 106/31.27 |
| 7,052,537 B2 * | 5/2006 | Uhlir-Tsang ............. 106/31.49 |
| 2002/0025412 A1 * | 2/2002 | Hanmura et al. .......... 428/195 |
| 2003/0116059 A1 | 6/2003 | Nguyen et al. |
| 2004/0003755 A1 * | 1/2004 | Fukumoto et al. ....... 106/31.58 |
| 2005/0025915 A1 * | 2/2005 | Uhlir-Tsang et al. .... 428/32.34 |
| 2005/0142306 A1 * | 6/2005 | Uhlir-Tsang et al. .... 428/32.34 |
| 2005/0233097 A1 * | 10/2005 | Tojo et al. ............... 428/32.26 |

FOREIGN PATENT DOCUMENTS

| EP | 0 425 429 A2 | 8/1990 |
| EP | 1 239 013 A1 | 9/2002 |
| JP | 6-25575 | 2/1994 |
| JP | 6-228476 | 8/1994 |
| JP | 6-248212 | 9/1994 |
| JP | 7-26178 | 1/1995 |
| JP | 7-228810 | 8/1995 |
| JP | 7-268261 | 10/1995 |
| JP | 8-100141 A | 4/1996 |
| JP | 8-259865 | 10/1996 |
| JP | 8-337745 | 12/1996 |
| JP | 9-12946 | 1/1997 |
| JP | 9-12949 | 1/1997 |
| JP | 2002-244257 | 8/2002 |
| JP | 2002-244259 | 8/2002 |
| WO | WO98/34926 A1 | 8/1998 |

* cited by examiner

Primary Examiner—Helene Klemanski
(74) Attorney, Agent, or Firm—Buchanan Ingersoll & Rooney PC

(57) ABSTRACT

An ink-jet ink containing a colorless, water-soluble, planar compound having more than ten delocalized pi-electrons per molecule.

7 Claims, No Drawings

INK JET AND INK JET RECORDING METHOD

FIELD OF THE INVENTION

This invention relates to an ink jet ink containing a water-soluble aromatic compound highly effective in reducing bronzing, an ink jet recording method, and a method of reducing bronzing of an ink jet printed image.

BACKGROUND OF THE INVENTION

Ink jet recording has been popularized rapidly and will see further development because of low material cost, high speed, low-noise, and ease of full color recording. Fundamentally, ink jet recording is divided into a continuous method in which ink droplets are continuously allowed to fly and a drop-on-demand method in which ink droplets are ejected in response to image information signals. The mechanism of drop formation and ejection includes a piezoelectric system in which pressure is applied to ink by a piezoelectric element to eject ink droplets, a thermal system in which heat is applied to ink to create bubbles whereby to eject an ink droplet, an ultrasonic system, and an electrostatic system. Ink jet inks include aqueous ink, oily ink, and hot-melt or solid ink.

Colorants used in the ink-jet inks are required to have (1) good solubility in ink solvents, e.g., water, (2) capability of high-density recording, (3) satisfactory hues, (4) color fastness against light, heat, active gases in the atmosphere (e.g., $NO_x$, oxidizing gases such as ozone, and $SO_x$), (5) resistance against water or chemicals, (6) good fixability on image receiving media with minimized feathering, (7) stability in ink formulations, (8) non-toxicity, (9) high purity, and (10) inexpensiveness.

In particular, colorants for ink jet recording are strongly required to be fast to light, humidity and heat, and, when used in printing a substrate having an ink receiving layer containing white, porous, inorganic pigment particles, to exhibit resistance against environmental oxidizing gases such as ozone, and to have high water resistance.

Among defects of ink jet prints is bronzing, a visual effect observed in areas of high optical density in which the surface of a recorded image reflects light to take on a metallic appearance because the colorant crystallizes on the print surface as it dries. Bronzing tends to occur when a colorant is made less water-soluble or when a hydrogen bond is introduced into a colorant structure so as to improve print resistance to water, light or gas. The light reflection and scattering due to bronzing not only reduces the optical density of the image but also varies the hue of the recorded image from what is expected and impairs the transparency of the image. Freedom from bronzing is one of important performance properties required of ink jet ink.

Known means for suppressing bronzing include (a) addition of a specific nitrogen compound (see JP-A-6-25575, JP-A-6-228476, JP-A-6-248212, JP-A-7-228810, JP-A-7-268261, JP-A-9-12946, and JP-A-9-12949), (b) addition of a specific heterocyclic compound (see JP-A-8-259865), (c) addition of a specific titanium compound (see JP-A-8-337745), and (d) addition of an alkali metal ion (see JP-A-7-26178). These additives succeed in controlling development of bronzing but raise a different problem. Some of them should be used in a large quantity because of insufficient effect, and some others can deteriorate ink properties and image qualities, such as storage stability of ink. According to JP-A-8-259865, for example, addition of an alkanolamine to ink prevents bronzing, but addition of only a small amount of an alkanolamine results in an increase of ink pH to 11 or higher. Such a high pH ink not only affects ink jet nozzles but lacks safety in case of contact with skin and also reduces print quality and water resistance of prints.

Likewise the additives heretofore proposed, while effective in various aspects, meet difficulty in producing the expected results while retaining the performance properties of ink formulations. Where the solubility and association of a colorant should be taken into due consideration, selection of the kind and amount of an additive would be understandably difficult. When an ionic additive is used, the influences of the counter ion must be considered. It has therefore been demanded to explore the molecular design of an additive based on an innovative idea and to introduce a method for essentially controlling bronzing with the additive.

SUMMARY OF THE INVENTION

An object of the present invention is to provide novel ink having absorption characteristics in favor of reproduction of three primary and black colors and sufficient fastness against light, heat, humidity, and environmental active gases.

Another object of the invention is to provide ink, such as ink-jet ink, capable of providing a color image and a coloring material that are excellent in hue and fastness.

Still another object of the invention is to provide an ink-jet ink and an ink jet recording method that use a phthalocyanine colorant, an anthrapyridone colorant or an azo colorant and provide an image with satisfactory hues and high fastness to light and environmental active gases, particularly ozone gas, and free from bronzing.

Yet another object of the invention is to provide a method of reducing bronzing of a recorded image by taking advantage of the ink jet recording method.

In the field of silver halide photographic materials an agent for reducing residual color is used in order to remove spectral sensitizers from a light-sensitive material during development processing. The mechanism of action of the agent is believed to include efficiently deflocculating sensitizer agglomerates adsorbed on silver halide grains and accelerating elution of the sensitizer from the gelatin film. Deflocculants of this type are disclosed in JP-A-63-55544. JP-A-2001-174957 proposes using a compound having a n-electron system with a wide plane as an agent for reducing contamination with colorant in silver halide photographic processing. The present inventors have noted that the above-mentioned agents for reducing residual color or for reducing contamination with colorant proposed for use in photographic materials might be an effective solution of the above discussed problems of ink jet recording. As a result of intensive investigations, the inventors have found that bronzing can be reduced by addition of a compound having a specific structure.

A first aspect of the invention relates to an ink-jet ink containing a colorless, water-soluble, planar compound having more than ten delocalized pi-electrons per molecule.

The ink-jet ink preferably contains a colorant selected from a phthalocyanine colorant, an anthrapyridone colorant, a monoazo colorant, a disazo colorant, a trisazo colorant, and a tetrakisazo colorant.

The water soluble planar compound is preferably a compound having at least two aromatic rings.

The water soluble planar compound is preferably a nonfluorescent compound having an absorption peak at a wavelength of 350 nm or shorter and a molar absorptivity of 10,000 or less.

The water soluble planar compound preferably has a sulfo group.

A second aspect of the invention relates to an ink jet recording method comprising using the above-described ink.

A third aspect of the invention relates to a method of reducing bronzing in ink jet recording comprising using a colorless, water-soluble, planar compound having more than ten delocalized pi-electrons per molecule.

The present invention provides an ink jet ink capable of providing a color image excellent in color reproduction, sufficiently fast to light, heat, humidity, and environmental active gases, and free from bronzing. The invention also provides an ink jet recording method that prevents bronzing of a recorded image and a method of preventing bronzing of a recorded image.

DETAILED DESCRIPTION OF THE INVENTION

The colorless, water-soluble, planar compound having more than ten delocalized pi-electrons per molecule will be described in detail. As the number of pi electrons of a delocalized pi electron system of a compound increases to widen the pi electron system, the compound tends to come to show absorption in the visible region. The term "colorless" as used herein is intended to include a slightly colored state to such an extent that does not affect a recorded image. The compound could have fluorescence but is preferably a non-fluorescent compound, particularly a non-fluorescent compound having an absorption peak at a wavelength of 350 nm or shorter, desirably 320 nm or shorter, and a molar absorptivity of 10,000 or less.

The compound has more than 10 delocalized pi electrons per molecule. The upper limit of the number of the pi electrons is, while not limited, preferably 80, still preferably 50, particularly preferably 30. The eleven or more pi electrons can form a single large delocalized system or two or more delocalized systems. Those having two or more aromatic rings per molecule are especially favorable. The aromatic ring may be an aromatic hydrocarbon ring, an aromatic heterocyclic ring containing a hetero atom or a condensed aromatic ring. The aromatic ring includes benzene, naphthalene, anthracene, pyridine, pyrimidine, pyrazine, and triazine.

It is desirable for the water soluble, planar compound to have a solubility of at least 1 g, more desirably at least g, most desirably at least 10 g, in 100 g of water at 20° C.

The compound having at least two aromatic rings preferably has at least two solubilizing groups bonded to the aromatic rings per molecule. Useful solubilizing groups include, but are not limited to, a sulfo group, a carboxyl group, a hydroxyl group, a phosphono group, a carbonamido group, a sulfonamido group, a quaternary ammonium salt group, and any other groups obvious to one skilled in the art. Preferred of them are a sulfo group and a carboxyl group. A sulfo group is the most preferred.

The maximum number of solubilizing groups per molecule is limited only by the number of positions capable of substitution. Ten solubilizing groups, which may be the same or different, per molecule would suffice in practice to achieve the object. The counter cations of the solubilizing groups include, but are not limited to, alkali metal cations, an ammonium cation, and organic cations (e.g., tetramethylammonium, guanidinium or pyridinium cation). Alkali metal and ammonium cations are preferred. Lithium, sodium, potassium and ammonium cations are still preferred. Lithium, sodium and ammonium cations are particularly preferred.

Specific examples of the water soluble, planar compound useful in the invention are given, e.g., in JP-A-63-55544 supra, JP-A-3-1469470, JP-A-3-149543, JP-A-2001-201831, JP-A-2002-139822, JP-A-2002-196460, JP-A-2002-244257, JP-A-2002-244259, JP-A-2002-296743, JP-A-2002-296744, JP-A-2003-307823, JP-A-2003-255502, JP-A-2004-4500, and JP-A-2004-170964.

Of the useful compounds preferred are those represented by formula (1):

A-X-L-(Y—B)$_n$ (1)

wherein A, L, and B each represent an aromatic group, inclusive of an aryl group and an aromatic heterocyclic group; X and Y each represent a divalent linking group; and n-represents 0 or 1.

In formula (1), the aromatic ring may be a monocyclic ring or a condensed ring. The divalent linking groups X and Y include an alkylene group, an alkenylene group, —CO—, —SO$_n$— (n: 0, 1 or 2), —NR— (R: a hydrogen atom, an alkyl group, an aryl group or a heterocyclic group), —O—, and combinations of these linking groups or atoms. The compound of formula (1) contains at least one ionic hydrophilic group selected from a sulfo group, a carboxyl group, a phenolic hydroxyl group, and a phosphono group. The ionic hydrophilic group can be in the form of a salt. In that case, the counter cation includes, but is not limited to, alkali metal cations, an ammonium cation, and organic cations (e.g., tetramethylammonium, guanidinium or pyridinium cation). Alkali metal and ammonium cations are preferred. Lithium, sodium, potassium and ammonium cations are still preferred. Lithium, sodium and ammonium cations are particularly preferred.

The compound of formula (1) can additionally have a substituent other than the ionic hydrophilic group, such as an alkyl group, an aryl group, an aralkyl group, a heterocyclic group, an alkoxy group, an aryloxy group, a hydroxyl group, an amino group (inclusive of anilino and heterocyclic amino), an acyl group, an acylamino group, a ureido group, a halogen atom, a sulfamoyl group, a carbamoyl group, a sulfonamido group, a sulfonyl group, a sulfenyl group, and a sulfinyl group. The enumerated substituents may have a substituent.

Preferred of the compounds of formula (1) are those in which n is 1 and those in which at least one of A, L, and B is an aromatic heterocyclic ring. Still preferred are those containing two to four ionic hydrophilic groups.

It is not clear what mechanism of action accounts for the bronzing preventive effect of the compound according to the present invention. It is considered that the compound of the invention exhibits stronger interaction of its pi electrons than the intermolecular interaction of the colorant's pi electrons so that it acts as a deflocculant, exerting its pi electrons' interaction on the colorant molecules agglomerated (associated) to one another through their pi electrons' intermolecular force thereby reducing bronzing. In order for the compound (hereinafter sometimes referred to as a deflocculant) to penetrate between agglomerated colorant molecules or to exert its deflocculating effect on the surface of colorant agglomerates, it is important for the compound to be planar and to have a widely spread pi electron system. It is also important for the compound to have sufficient solubility so that the compound per se or a complex formed of the compound and a colorant may not precipitate. The required number of pi electrons depends on the molecular size of the colorant. Seeing that the colorants used in ink-jet inks have a widespread planar structure for securing fixability as is typical with direct dyes, it appears that the deflocculant should be a colorless, water soluble, planar compound with a widespread delocalized pi electron system having more than ten pi electrons per molecule.

The deflocculant of the invention deflocculates the colorant agglomerates and can form a complex with the colorant. The deflocculant-colorant complex provides the colorant with protection against ozone gas. Thus, the present invention is also effective in improving ozone resistance of a recorded image.

Examples of compounds that are preferred in the invention are described in JP-A-2002-139822, JP-A-2002-196460, JP-A-2002-244257, JP-A-2002-244259, JP-A-2002-296743, JP-A-2002-296744, and JP-A-2003-307823 recited supra. Typical compounds (defloculants) are shown below.

P-1

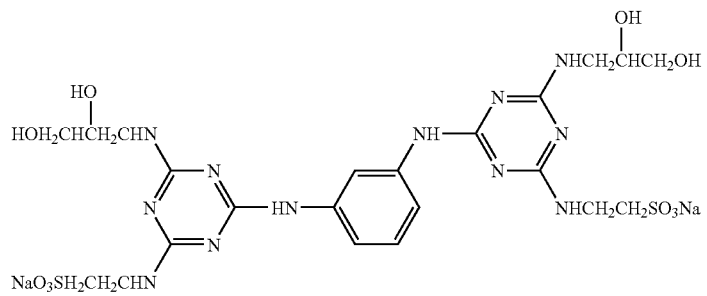

P-2

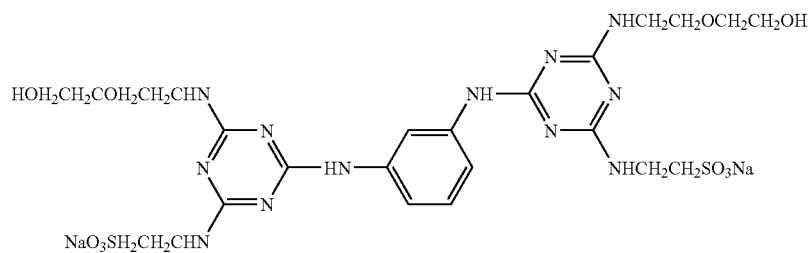

P-3

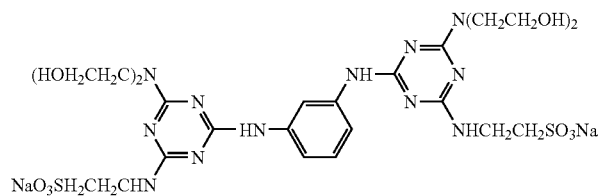

P-4

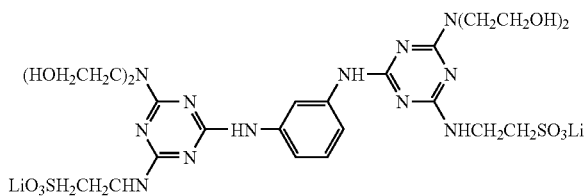

P-5

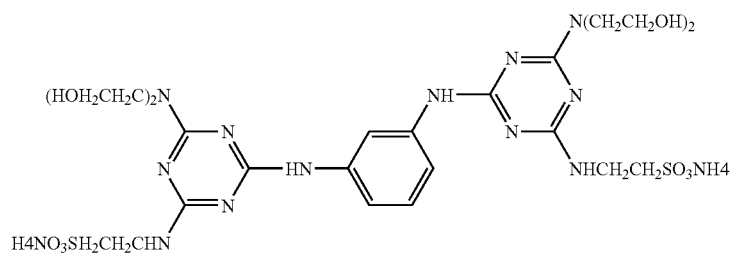

P-6

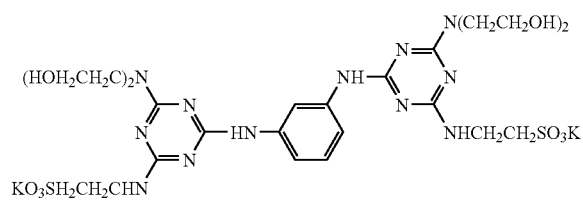

P-7

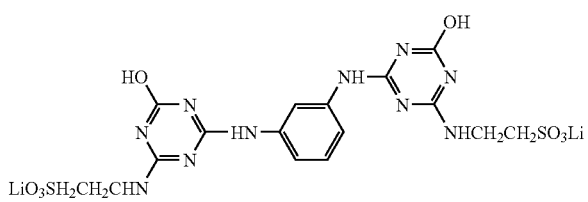

-continued
P-8
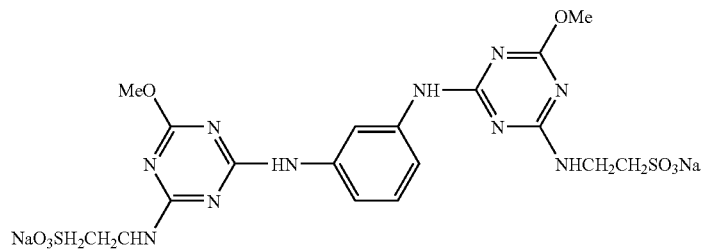
P-9
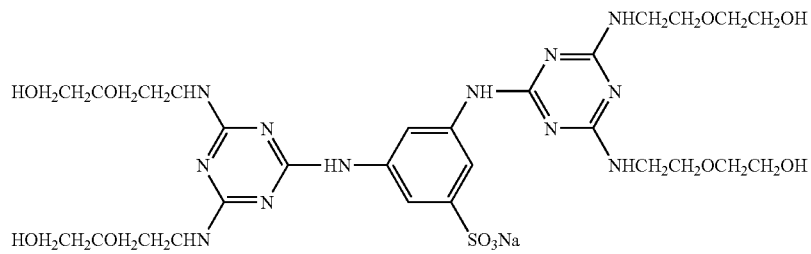
P-10 P-11
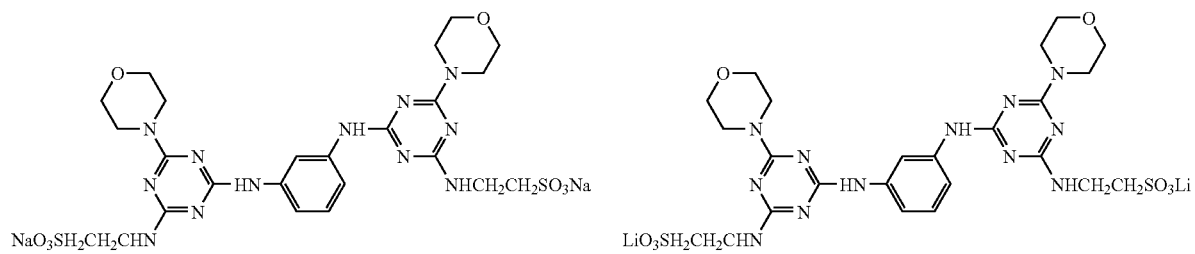
P-12
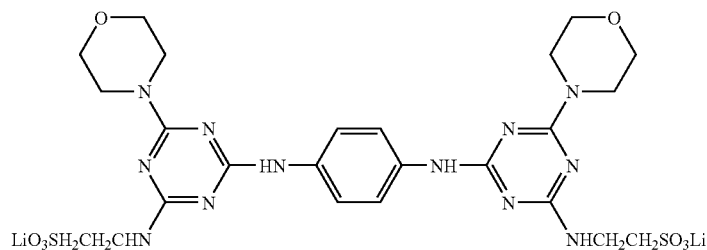
P-13
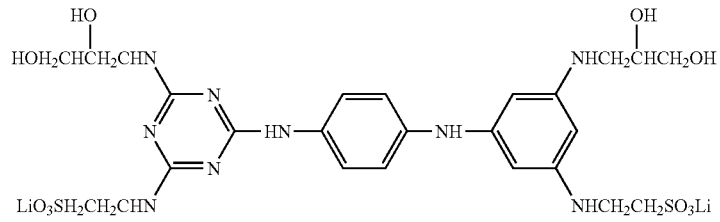
P-14 P-15
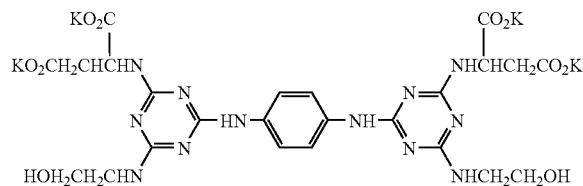 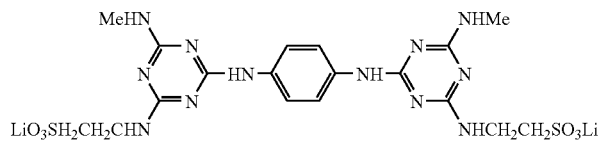

-continued
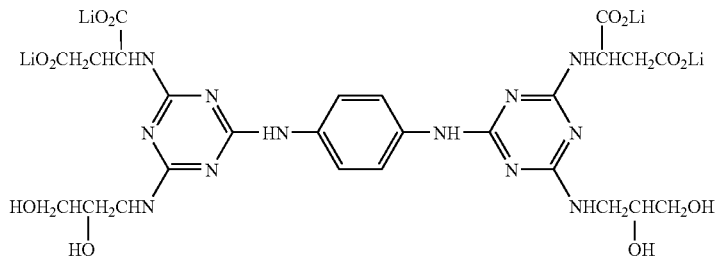
P-16
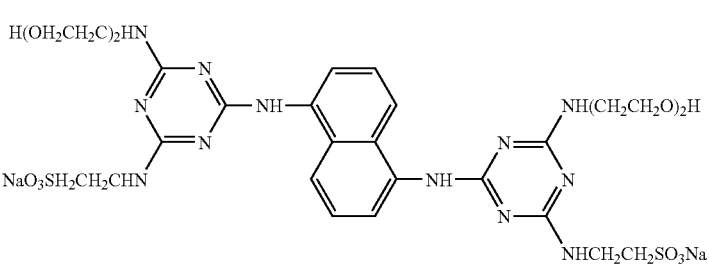
P-17
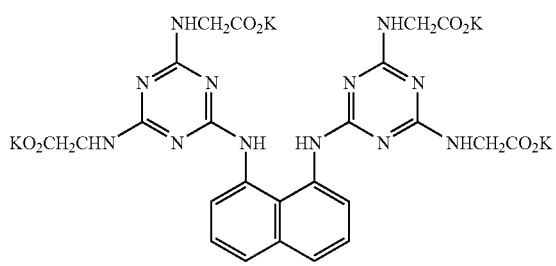
P-18
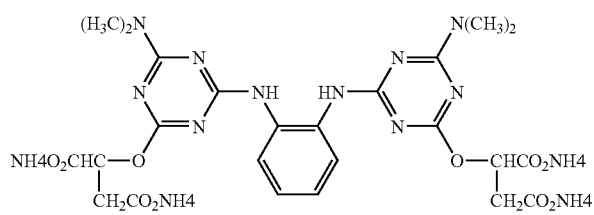
P-19
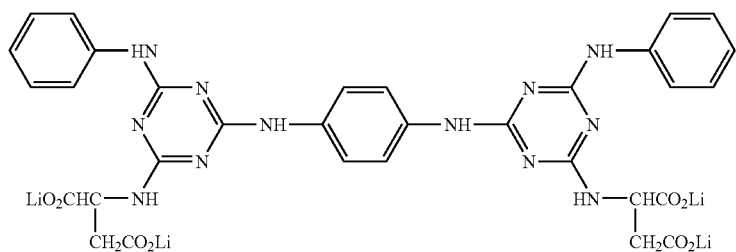
P-20
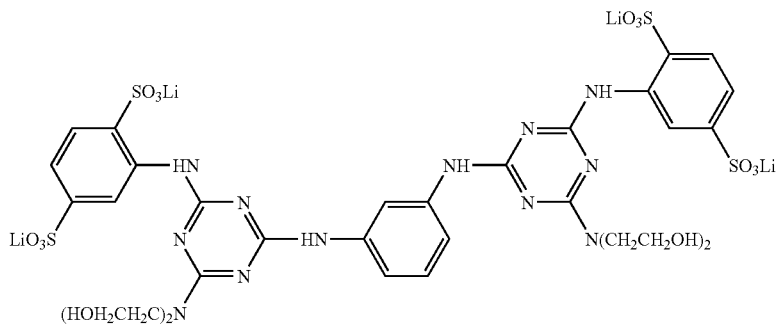
P-21

P-22
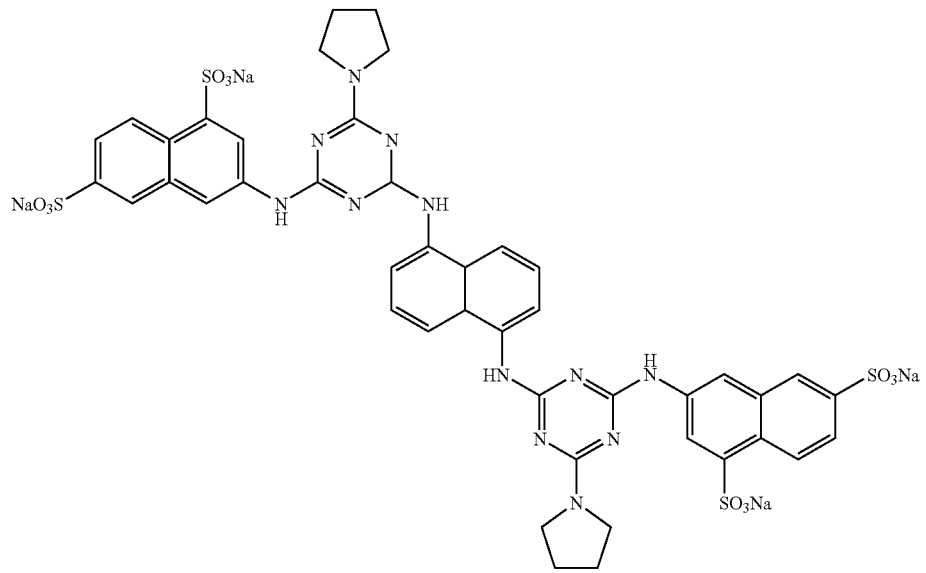
P-23
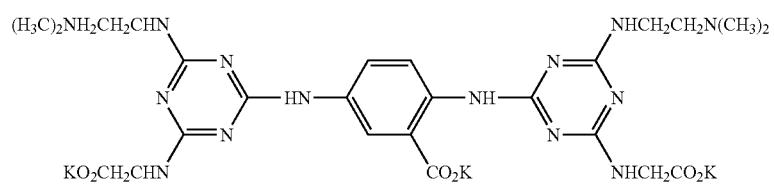
P-24
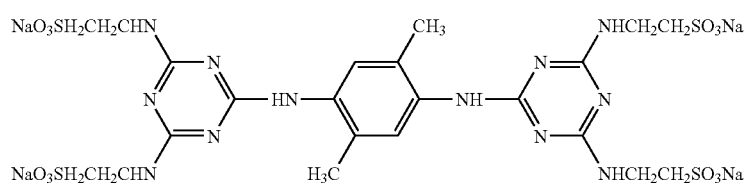
P-25
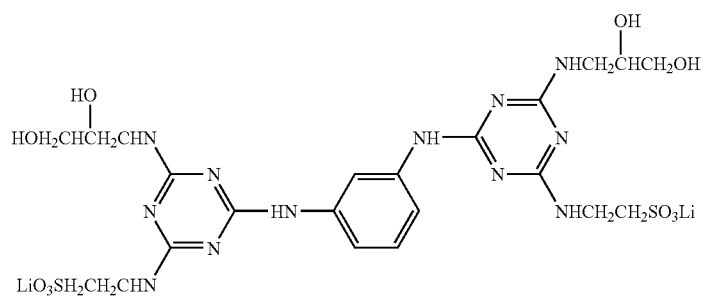

-continued
P-26
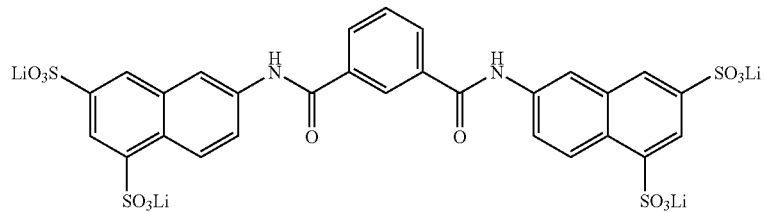
P-27
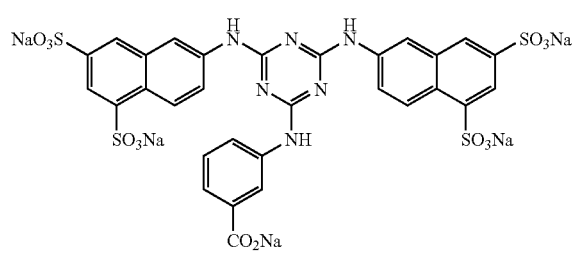
P-28
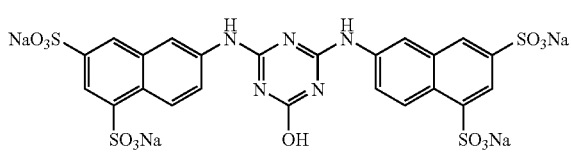
P-29
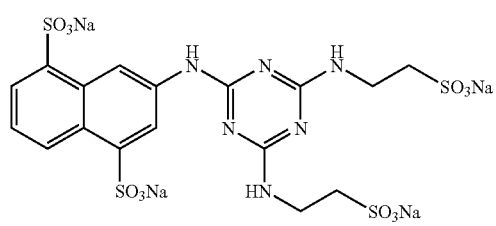
P-30
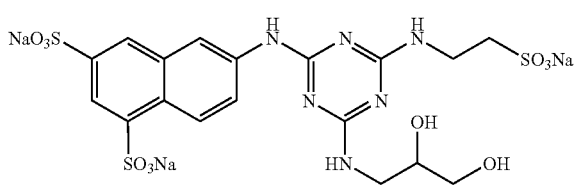
P-31
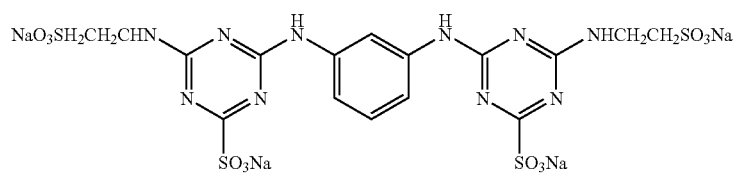
P-32
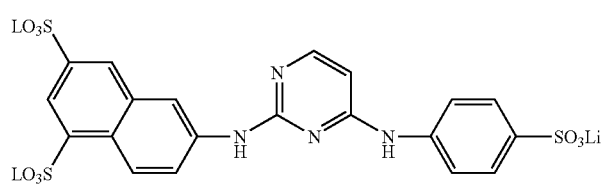

The preferred compounds of the invention can be synthesized with reference to, e.g., JP-A-2002-139822 supra.

The colorants that can be used in the ink of the invention are not limited. Taking into consideration the effectiveness of the invention, phthalocyanine colorants, anthrapyridone colorants, and mono- dis-, tris- or tetrakisazo colorants are suitable to be combined with the deflocculant of the invention because they have tendency toward molecular association, and colorants with higher tendency to association are more likely to cause bronzing. Furthermore, phthalocyanine colorants, disazo colorants, and trisazo colorants markedly gain in fastness when the molecules associate with one another. Therefore, combined use of the deflocculant of the invention is especially effective in controlling the association.

Phthalocyanine colorants that are preferably used in the invention are represented by formula (2):

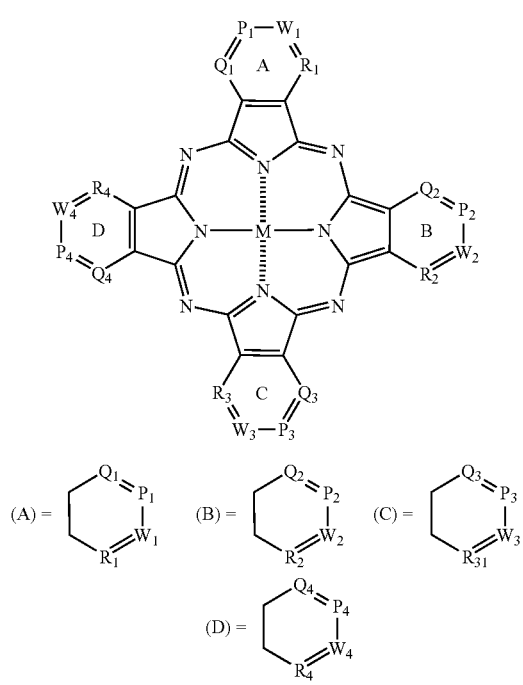

wherein $Q_1$, $Q_2$, $Q_3$, and $Q_4$ each represent =C($J_1$)- and/or —N=; $P_1$, $P_2$, $P_3$, and $P_4$ each represent =C($J_2$)- and/or —N=; $W_1$, $W_2$, $W_3$, and $W_4$ each represent =C ($J_3$)- and/or —N=; $R_1$, $R_2$, $R_3$, and $R_4$ each represent =C ($J_4$)- and/or —N=; $J_1$, $J_2$, $J_3$, and $J_4$ each represent a hydrogen atom or a substituent; and M represents a hydrogen atom, a metallic element, a metal oxide, a metal hydroxide or a metal halide.

In formula (2) the rings composed of ($Q_1$, $P_1$, $W_1$, and $R_1$), ($Q_2$, $P_2$, $W_2$, and $R_2$), ($Q_3$, $P_3$, $W_3$, and $R_3$), and ($Q_4$, $P_4$, $W_4$, and $R_4$) are designated rings A, B, C, and D, respectively. It is preferred that at least one of the rings A to D be an aromatic hydrocarbon ring. It is still preferred that at least two of the rings A to D be each an aromatic hydrocarbon group. The heterocyclic group any of the rings A to D may represent is preferably a pyridine ring or a pyrazine ring. The substituent represented by $J_1$, $J_2$, $J_3$ or $J_4$ is preferably an electron attracting substituent. At least one of the substituents $J_1$, $J_2$, $J_3$, and $J_4$ or at least one of the substituents that may be possessed by the substituents $J_1$, $J_2$, $J_3$, and $J_4$ has a substituent imparting solubility, i.e., an ionic hydrophilic group where the dye is water soluble, or a hydrophobic group where the dye is oil soluble.

The aromatic hydrocarbon group that any of rings A to D can represent is preferably represented by formula (2-1):

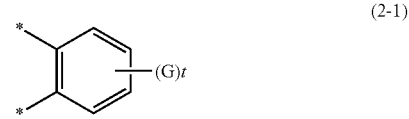

wherein the asterisk * indicates the position at which the ring is bonded to the phthalocyanine skeleton; G represents —SO-$Z_1$, —SO$_2$-$Z_1$, —SO$_2$NZ$_1$Z$_2$, —CONZ$_1$Z$_2$, —CO$_2$Z$_1$, —COZ$_1$ or a sulfo group; t represents an integer of 1 to 4; $Z_1$ represents a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group or a substituted or unsubstituted heterocyclic group; and $Z_2$ represents a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group or a substituted or unsubstituted heterocyclic group; when t is 2 or greater, $Z_1$'s or $Z_2$'s may be the same or different.

In formula (2-1), G is preferably —SO-$Z_1$, —SO$_2$-$Z_1$, —SO$_2$NZ$_1$Z$_2$, —CONZ$_1$Z$_2$, —CO$_2$Z$_1$ or —COZ$_1$, still preferably —SO-$Z_1$, —SO$_2$-$Z_1$ or —SO$_2$NZ$_1$Z$_2$, particularly preferably —SO$_2$-$Z_1$. t is preferably 1 or 2, still preferably 1.

$Z_1$ is preferably a substituted or unsubstituted alkyl group, a substituted or unsubstituted aryl group or a substituted or unsubstituted heterocyclic group, still preferably a substituted alkyl group, a substituted aryl group or a substituted heterocyclic group.

$Z_2$ is preferably a hydrogen atom, a substituted or unsubstituted alkyl group, a substituted or unsubstituted aryl group or a substituted or unsubstituted heterocyclic group, still preferably a hydrogen atom, a substituted alkyl group, a substituted aryl group or a substituted heterocyclic group.

Where one or more of the rings A to D represent an aromatic hydrocarbon group, it is particularly preferred that at least one of the aromatic hydrocarbon groups is represented by formula (2-2):

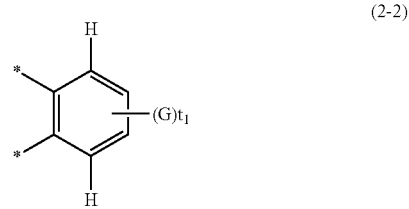

wherein the asterisk * indicates the position at which the ring is bonded to the phthalocyanine skeleton; G is as defined above; and t1 is 1 or 2.

In formula (2-2), the preferred, the still preferred, and the particularly preferred groups as G are the same as those described with respect to formula (2-1). t1 is preferably 1. It is the most preferred that all the aromatic hydrocarbon rings are represented by formula (2-2).

Of the phthalocyanine colorants preferred are phthalocyanine dyes represented by formula (3):

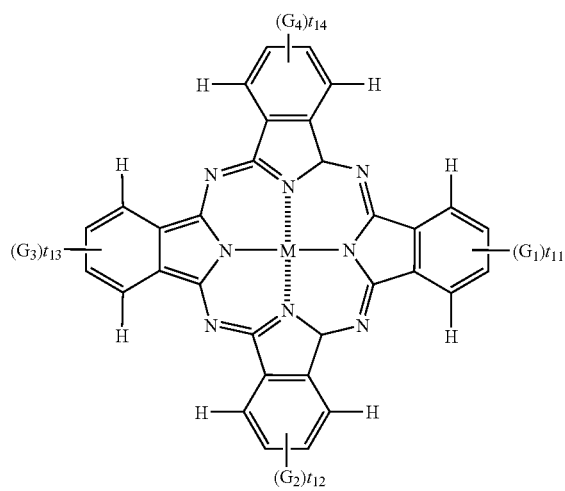

(3)

wherein $G_1$, $G_2$, $G_3$, and $G_4$ have the same meaning as G in formula (2-1); M is as defined in formula (2); and $t_{11}$, $t_{12}$, $t_{13}$, and $t_{14}$ each represent 1 or 2.

In formula (3), the preferred, the still preferred, and the particularly preferred groups as $G_1$, $G_2$, $G_3$, and $G_4$ are the same as those described with respect to G. $t_{11}$, $t_{12}$, $t_{13}$, and $t_{14}$ are each preferably 1.

As referred to in JP-A-2003-213168, most of phthalocyanine dyes, except those prepared from phthalonitrile derivatives having axisymmetric substituents on the benzene rings, are not compounds having a single structure but mixtures of compounds having different chemical structures attributed to the synthetic method. In the present invention, the terminology "phthalocyanine colorant (dye)" is intended to include both a single structure and a mixture of different structures.

Examples of suitable phthalocyanine dyes are listed in Tables 1 through 3.

TABLE 1

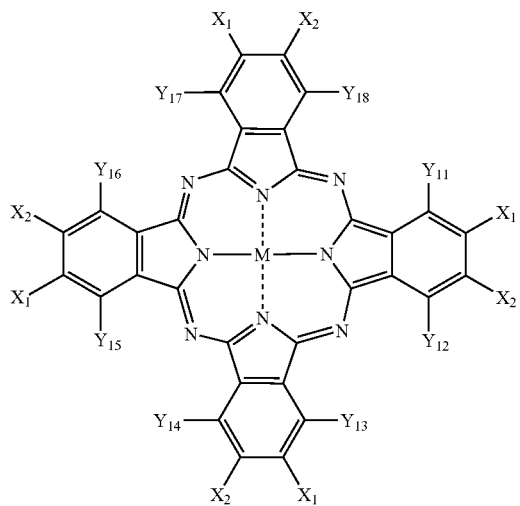

| No. | M | X1 | X2 | Y11, Y12 | Y13, Y14 | Y15, Y16 | Y17, Y18 |
|---|---|---|---|---|---|---|---|
| 101 | Cu | —SO$_2$—NH—CH$_2$—CH(CH$_3$)—SO$_3$Li | —H | —H, —H | —H, —H | —H, —H | —H, —H |
| 102 | Cu | —SO$_2$—NH—CH$_2$—CH(OH)—CO—NH—CH$_2$—CH$_2$—SO$_3$Na | —H | —Cl, —H | —Cl, —H | —Cl, —H | —Cl, —H |
| 103 | Cu | —SO$_2$—NH—CH$_2$—CH$_2$—CH$_2$—SO$_2$—NH—CH$_2$—CH(OH)—SO$_3$Li | —CN | —H, —H | —H, —H | —H, —H | —H, —H |

TABLE 1-continued

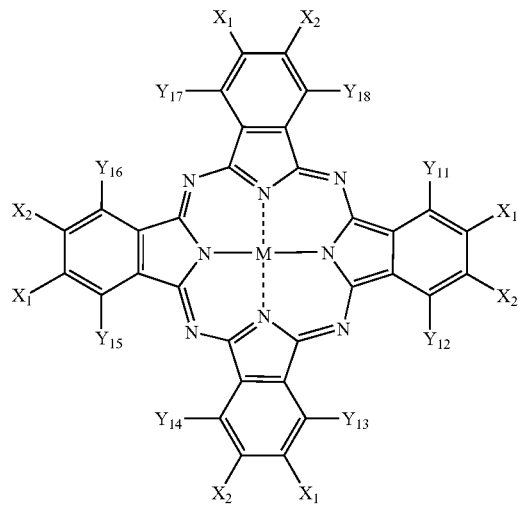

| No. | M | X1 | X2 | Y11, Y12 | Y13, Y14 | Y15, Y16 | Y17, Y18 |
|---|---|---|---|---|---|---|---|
| 104 | Cu | —SO$_2$—NH—⟨C$_6$H$_4$⟩—SO$_2$—NH—CH$_2$—CH(OH)—SO$_3$Li | —Cl | —H, —H | —H, —H | —H, —H | —H, —H |
| 105 | Ni | —SO$_2$—NH—CH$_2$—CH(OH)—CO—NH—CH(CH$_2$—COONa)—COONa | —H | —Cl, —H | —Cl, —H | —Cl, —H | —Cl, —H |
| 106 | Cu | —SO$_2$—NH—CH$_2$—CH$_2$—SO$_2$—NH—CH(CH$_2$—OH)—COONa | —CN | —H, —H | —H, —H | —H, —H | —H, —H |
| 107 | Cu | —SO$_2$CH$_2$CH$_2$CH$_2$SO$_3$Li | —H | —H, —H | —H, —H | —H, —H | —H, —H |
| 108 | Cu | —SO$_2$—CH$_2$—CH(OH)—CH$_2$—SO$_3$Li | —H | —H, —H | —H, —H | —H, —H | —H, —H |
| 109 | Cu | —SO$_2$—CH$_2$—CH$_2$—CH(CH$_3$)—SO$_3$K | —H | —H, —H | —H, —H | —H, —H | —H, —H |
| 110 | Cu | —SO$_2$—CH$_2$—CH$_2$—CH$_2$—CO—NH—CH(CH$_3$)—COOLi | —SO$_3$Li | —H, —H | —H, —H | —H, —H | —H, —H |
| 111 | Cu | —SO$_2$—NH—CH$_2$—CH$_2$—CH$_2$—SO$_2$—NH—CH$_2$—CH(OH)—CH$_2$—SO$_3$Li | —H | —H, —H | —H, —H | —H, —H | —H, —H |
| 112 | Cu | —SO$_2$—NH—CH$_2$—CH$_2$—CH$_2$—SO$_2$—NH—CH$_2$—CH(OH)—CH$_2$ | —SO$_3$Li | —H, —H | —H, —H | —H, —H | —H, —H |
| 113 | Cu | —SO$_2$—NH—CH$_2$—CH$_2$—CH$_2$—CO—NH—CH(COONa)—CH$_2$—CH$_2$—SO$_3$Na | —H | —Cl, —H | —Cl, —H | —Cl, —H | —Cl, —H |
| 114 | Cu | —SO$_2$—CH$_2$—CH(OH)—CH$_3$ | —SO$_3$Li | —H, —H | —H, —H | —H, —H | —H, —H |
| 115 | Cu | —SO$_2$—CH$_2$—CO$_2$—CH(CH$_2$—COOLi)—NH—CH$_2$—CH$_2$—SO$_3$Li | —H | —Cl, —H | —Cl, —H | —Cl, —H | —Cl, —H |

TABLE 1-continued

[Structure: A phthalocyanine macrocycle with central metal M coordinated to four isoindole units, with substituents X₁, X₂ and Y₁₁–Y₁₈ positions labeled around the periphery]

| No. | M | X1 | X2 | Y11, Y12 | Y13, Y14 | Y15, Y16 | Y17, Y18 |
|-----|----|---|----|----|----|----|----|
| 116 | Cu | —CO—NH—CH₂—CH(OH)—CH₂—SO₃K | —H | —H, —H | —H, —H | —H, —H | —H, —H |
| 117 | Cu | —CO—NH—CH(COOLi)—CH₂—CH₂—SO₃Li | —H | —H, —H | —H, —H | —H, —H | —H, —H |
| 118 | Cu | —CO—NH—CH₂—CH₂—SO₂—NH—CH₂—CH(OH)—CH₂—SO₃Na | —CN | —H, —H | —H, —H | —H, —H | —H, —H |
| 119 | Cu | —SO₂—CH₂—CH(OH)—CH₂—SO₃Na | —H | —H, —H | —H, —H | —H, —H | —H, —H |
| 120 | Cu | —SO₂—CH₂—CH₂—CH(CH₃)—COOK | —H | —H, —H | —H, —H | —H, —H | —H, —H |
| 121 | Cu | —CO₂—CH₂—CH₂—CH₂—SO₂—NH—CH(CH₂—OH)—COONa | —H | —H, —H | —H, —H | —H, —H | —H, —H |
| 122 | Cu | —CO₂—CH₂—CH₂—CH₂—SO₂—NH—CH(OH)—CH₂—CH₂—SO₃Li | —H | —H, —H | —H, —H | —H, —H | —H, —H |
| 123 | Cu | —SO₂—NH—CH₂—CH(CH₃)—CH₂—CH₃ | —H | —H, —H | —H, —H | —H, —H | —H, —H |
| 124 | Cu | —SO₂—NH—CH₂—CH(CH₂—CH₃)—CH₂—CH₃—CH₂—CH₃ | —H | —H, —H | —H, —H | —H, —H | —H, —H |
| 125 | Cu | —SO₂—CH₂—CH₂—CH₂—SO₂—NH—CH₂—CH(CH₃)—CH₂—CH₃ | —H | —H, —H | —H, —H | —H, —H | —H, —H |
| 126 | Cu | —SO₂—CH₂—CH₂—CH₂—CO₂—CH(CH₃)—CH₂—CH₂—O—CH₃ | —H | —H, —H | —H, —H | —H, —H | —H, —H |
| 127 | Cu | —CO₂—CH₂—CH₂—CH₂—CH₂—CO—NH—CH(CO₂—CH₂—CH₃)—CH₂—CO₂—CH₂—CH₃ | —H | —H, —H | —H, —H | —H, —H | —H, —H |

TABLE 1-continued

[Structure: Phthalocyanine macrocycle with central metal M, substituents X₁, X₂ on the benzene rings, and Y₁₁–Y₁₈ positions]

| No. | M | X1 | X2 | Y11, Y12 | Y13, Y14 | Y15, Y16 | Y17, Y18 |
|---|---|---|---|---|---|---|---|
| 128 | Zn | —SO₂—CH₂—CH(O—CH₃)—CH₂—O—CH₃ | —CN | —H, —H | —H, —H | —H, —H | —H, —H |
| 129 | Cu | —CO—NH—CH₂—CH(CH₂—CH₃)—CH₂—CH₃—CH₂—CH₃ | —H | —Cl, —H | —Cl, —H | —Cl, —H | —Cl, —H |
| 130 | Cu | —CO₂—CH(CH₃)—CH₂—CH₂—O—C₃H₈(I) | —CN | —H, —H | —H, —H | —H, —H | —H, —H |
| 131 | Cu | —SO₂—CH₂—CH₂—CH(CH₂)—SO₂—NH—C₆H₃(2-SO₃Li)(5-SO₃Li) | —H | —H, —H | —H, —H | —H, —H | —H, —H |
| 132 | Cu | —SO₂—CH₂—CH₂—CH₂—SO₂—NH—C₆H₁₀(OH) | —SO₃Li | —H, —H | —H, —H | —H, —H | —H, —H |
| 133 | Cu | —SO₂—CH(CH₃)—CH(O—C₆H₅)—CH₃ | —SO₃Li | —H, —H | —H, —H | —H, —H | —H, —H |
| 134 | Cu | —SO₂—NH—C₆H₄—SO₂—NH—CH₂—CH(CH₂—CH₃)—CH₂—CH₂—CH₂—CH₃ | —H | —H, —H | —H, —H | —H, —H | —H, —H |
| 135 | Cu | —SO₂—NH—CH(CO₂—CH₂—CH₃)—C₆H₅ | —H | —H, —H | —H, —H | —H, —H | —H, —H |
| 136 | Cu | —SO₂—NH—CH(COONa)—CH₂—C₆H₄—OH | —H | —H, —H | —H, —H | —H, —H | —H, —H |

TABLE 1-continued

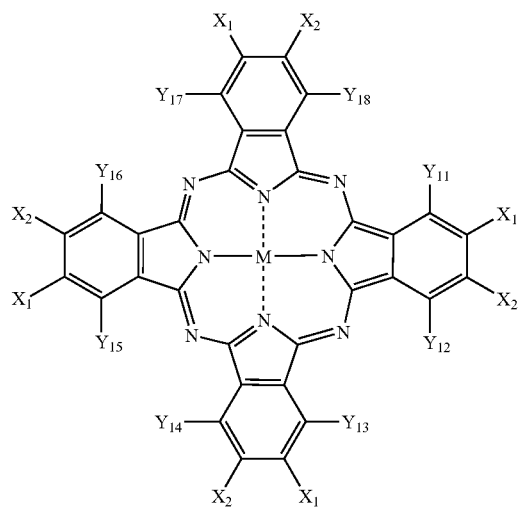

| No. | M | X1 | X2 | Y11, Y12 | Y13, Y14 | Y15, Y16 | Y17, Y18 |
|---|---|---|---|---|---|---|---|
| 137 | Cu | —CO—NH—CH(CH$_2$—CH$_3$)— (CO$_2$—CH$_2$—CH$_3$ on CH, phenyl) | —H | —H, —H | —H, —H | —H, —H | —H, —H |
| 138 | Cu | —SO$_2$—NH—CH(CH$_3$)—CO—NH—C$_6$H$_4$—SO$_3$Li | —CN | —H, —H | —H, —H | —H, —H | —H, —H |
| 139 | Cu | —CO$_2$—CH(CH$_3$)—C$_6$H$_4$—Cl | —Cl | —H, —H | —H, —H | —H, —H | —H, —H |
| 140 | Cu | —CO$_2$-CH$_2$-CH$_2$-CH$_2$-NH—[triazine with NH—CH$_2$—CH$_2$—CH(CH$_3$)—SO$_3$Li groups] | —H | —H, —H | —H, —H | —H, —H | —H, —H |
| 141 | Cu | —SO$_2$—NH—CH(COONa)—CH$_2$—CO—N(CH$_2$—CH$_2$—OH)$_2$ | —H | —H, —H | —H, —H | —H, —H | —H, —H |
| 142 | Cu | —CO—NH—CH$_2$CH(OH)—CH$_2$—COOK | —H | —H, —H | —H, —H | —H, —H | —H, —H |
| 143 | Cu | —CO—NH—CH$_2$CH(OH)—CO—NH—CH(COOK)—CH$_2$—CH$_2$—SO$_3$K | —H | —H, —H | —H, —H | —H, —H | —H, —H |
| 144 | Cu | —SO$_2$-CH$_2$-CH$_2$-CH$_2$-NH—CO—C$_6$H$_4$—CO-NH-CH(COONa)-CH$_2$-COONa | —H | —H, —H | —H, —H | —H, —H | —H, —H |
| 145 | Cu | —SO$_2$—CH$_2$—CH$_2$—CH$_2$—SO$_2$—NH—CH$_2$—CH(OH)—CH$_2$—OH | —H | —H, —H | —H, —H | —H, —H | —H, —H |

The order in which atoms and atomic groups making each of the sets of (X$_1$, X$_2$), (Y$_{11}$, Y$_{12}$), (Y$_{13}$, Y$_{14}$), (Y$_{15}$, Y$_{16}$) and (Y$_{17}$, Y$_{16}$) are displayed in Table 1 may be reversed.

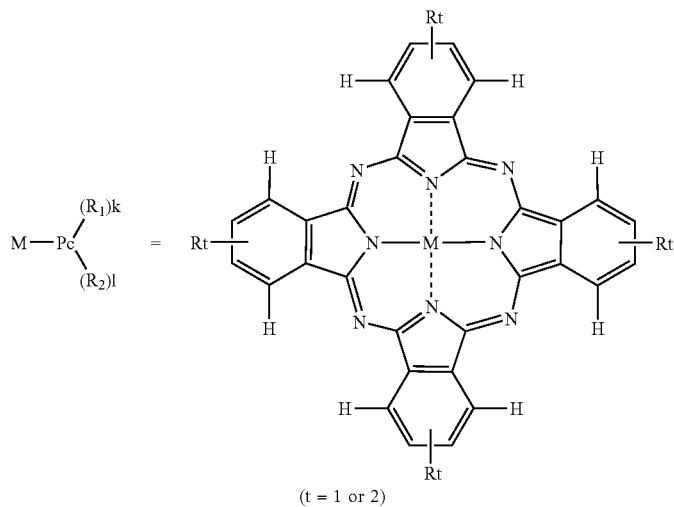

(t = 1 or 2)

| No. | M | R₁ | k |
|---|---|---|---|
| 146 | Cu | —SO₂—NH—CH₂—CH(CH₃)—SO₃Li | 3 |
| 147 | Cu | —SO₂—NH—CH₂—CH₂—SO₃Li | 3 |
| 148 | Cu | —SO₂—NH—CH₂—CH(CH₃)—SO₃Li | 3 |
| 149 | Cu | —SO₂—NH—CH₂—CH(CH₃)—SO₃Li | 2 |
| 150 | Cu | —SO₂—NH—CH₂—CH₂—SO₂—NH—CH₂—CH₂—COONa | 3 |
| 151 | Cu | —SO₂—NH—C₆H₄—SO₂—NH—CH₂—CH(OH)—SO₃Li | 3 |
| 152 | Cu | —SO₂—CH₂—CH₂—CH(CH₃)—SO₃Li | 2.5 |
| 153 | Cu | —SO₂—CH₂—CH₂—CH(CH₃)—SO₃Na | 2 |
| 154 | Cu | —SO₂—CH₂—CH₂—CH₂—SO₃Li | 3 |
| 155 | Cu | —SO₂—CH₂—CH₂—CH₂—COOK | 2 |
| 156 | Cu | —SO₂—CH₂—CH₂—CH₂—SO₃Li | 3 |
| 157 | Cu | —SO₂—CH₂—CH₂—O—CH₂—CH₂—SO₃Li | 2 |
| 158 | Cu | —SO₂—CH₂—CH(OH)—CH₂—SO₃Li | 3 |
| 159 | Cu | —SO₂—CH₂—CH₂—CH₂—SO₃Li | 2 |
| 160 | Cu | —SO₂—CH₂—CH₂—O—CH₂—CH₂—O—CH₂—CH₂—SO₃Na | 3 |
| 161 | Cu | —CO—NH—CH₂—CH(CH₃)—SO₃Li | 3 |
| 162 | Cu | —CO—NH—CH₂—CH₂—SO₃Li | 3 |

-continued

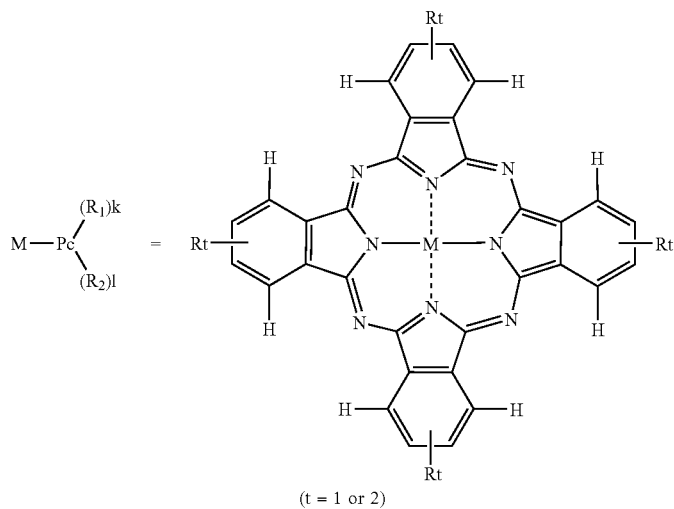

(t = 1 or 2)

| No. | M | Rt | t |
|---|---|---|---|
| 163 | Cu | —CO—NH—CH$_2$—CH(CH$_3$)—SO$_3$K | 3 |
| 164 | Cu | —CO—NH—CH$_2$—CH(CH$_3$)—SO$_3$Li | 2 |
| 165 | Cu | —CO—NH—CH$_2$—CH$_2$—SO$_3$K | 3 |
| 166 | Cu | —CO—NH—CH$_2$—CH$_2$—SO$_2$—NH—CH$_2$—CH$_2$—COONa | 3 |
| 167 | Cu | —CO—NH—CH$_2$—CH(CH$_3$)—SO$_3$Li | 2.5 |
| 168 | Cu | —CO$_2$—CH$_2$—CH$_2$—CH(CH$_3$)—SO$_3$Na | 2 |
| 169 | Cu | —CO$_2$—CH$_2$—CH$_2$—CH$_2$—SO$_3$Li | 3 |
| 170 | Cu | —CO$_2$—CH$_2$—CH$_2$—CH$_2$—COOK | 2 |
| 171 | Cu | —CO$_2$—CH$_2$—CH$_2$—O—CH$_2$—CH$_2$—O—CH$_2$—CH$_2$—SO$_3$Na | 3 |
| 172 | Cu | —CO$_2$—CH$_2$—CH$_2$—CH(OH)—CH$_2$—SO$_3$Li | 2 |
| 173 | Cu | —CO$_2$—CH$_2$—CH$_2$—CH$_2$—SO$_3$Li | 3 |
| 174 | Cu | —CO$_2$—CH$_2$—CH$_2$—CH$_2$—SO$_3$Li | 3 |
| 175 | Cu | —CO$_2$—CH$_2$—CH$_2$—O—CH$_2$—CH$_2$—SO$_3$Li | 3 |

| No. | R$_2$ | l |
|---|---|---|
| 146 | —SO$_2$—NH—CH$_2$—CH(OH)—CH$_3$ | 1 |
| 147 | —SO$_2$-NH—CH$_2$-CH$_2$-CH$_2$-SO$_2$—NH-CH$_2$-CH(OH)-CH$_3$ | 1 |
| 148 | —SO$_2$—NH—CH$_2$—CH$_2$—CH$_2$—SO$_2$—NH—CH$_2$—CH$_2$—O—CH$_2$—CH$_2$—OH | 1 |
| 149 | —SO$_2$—NH—CH$_2$—CH$_2$—CH$_2$—CO—N(CH$_2$—CH$_2$—OH)$_2$ | 2 |

-continued $M-Pc\begin{matrix}(R_1)k\\(R_2)l\end{matrix}$ = [phthalocyanine structure with M center, Rt substituents on benzene rings] (t = 1 or 2)

| No. | Structure | t |
|---|---|---|
| 150 | —SO$_2$—NH—CH(CH$_3$)—CH$_2$—OH | 1 |
| 151 | —SO$_2$—NH—CH$_2$—CH$_2$—O—CH$_2$—CH$_2$—OH | 1 |
| 152 | —SO$_2$—CH$_2$—CH$_2$—O—CH$_2$—CH$_2$—OH | 1.5 |
| 153 | —SO$_2$—CH$_2$—CH$_2$—CH$_2$—CO—N(CH$_2$—CH$_2$—OH)$_2$ | 2 |
| 154 | —SO$_2$-CH$_2$-CH$_2$-CH$_2$-SO$_2$—NH—CH$_2$—CH(OH)—CH$_3$ | 1 |
| 155 | —SO$_2$-CH$_2$-CH$_2$-CH$_2$-SO$_2$-NH-CH$_2$-CH(OH)-CH$_2$-COOK | 2 |
| 156 | —SO$_2$—CH$_2$—CH(OH)—CH$_2$—SO$_3$Li | 1 |
| 157 | —SO$_2$-CH$_2$-CH$_2$-CH$_2$-CO$_2$-CH$_2$-CH$_2$-CH(OH)—CH$_2$-COOK | 2 |
| 158 | —SO$_2$—CH$_2$—C$_6$H$_4$—SO$_2$—NH—CH$_2$—CH(OH)—CH$_2$—OH | 1 |
| 159 | —SO$_2$—CH$_2$—CH$_2$—CH$_2$—SO$_2$—NH—CH$_2$—CH(OH)—CH$_3$ | 2 |
| 160 | —SO$_2$—CH$_2$—CH$_2$—CH$_2$—CO—NH—CH(CH$_2$—CH$_2$—COONa)—CH$_2$—COONa | 1 |
| 161 | —CO—NH—CH$_2$—CH$_2$—CH$_2$—CO—N(CH$_2$—CH$_2$—OH)$_2$ | 1 |
| 162 | —CO—NH—CH$_2$—CH$_2$—CH$_2$—SO$_2$—NH—CH$_2$—CH(OH)—CH$_3$ | 1 |
| 163 | —CO—NH—CH$_2$—CH$_2$—CH$_2$—SO$_2$—NH—CH$_2$—CH$_2$—O—CH$_2$—CH$_2$—OH | 1 |
| 164 | —CO—NH—CH(CH$_3$)—CH$_2$OH | 2 |
| 165 | —CO—NH—CH$_2$—CH$_2$—O—CH$_2$—CH$_2$—OH | 1 |

-continued

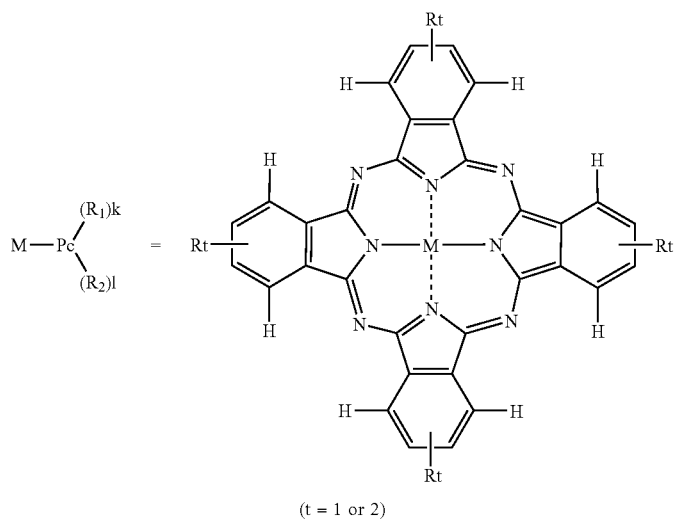

(t = 1 or 2)

| | | |
|---|---|---|
| 166 | —CO—NH—CH$_2$—CH(OH)—CH$_3$ | 1 |
| 167 | —CO—NH—CH$_2$—CH$_2$—CH$_2$—CO—N(CH$_2$—CH$_2$—OH)$_2$ | 1.5 |
| 168 | —CO$_2$—CH$_2$—CH$_2$—CH$_2$—CO—N(CH$_2$—CH$_2$—OH)$_2$ | 2 |
| 169 | —CO$_2$—CH$_2$—CH$_2$—CH$_2$—SO$_2$—NH—CH$_2$—CH(OH)—CH$_3$ | 1 |
| 170 | —CO$_2$—CH$_2$—CH$_2$—CH$_2$—SO$_2$—NH—CH$_2$—CH(OH)—CH$_2$—COOK | 2 |
| 171 | —CO$_2$—CH$_2$—C$_6$H$_4$—SO$_2$—NH—CH$_2$—CH(OH)—CH$_2$—OH | 1 |
| 172 | —CO$_2$—CH$_2$—CH$_2$—CH$_2$—CO$_2$—CH$_2$—CH$_2$—CH(OH)—CH$_2$—COOK | 2 |
| 173 | —CO$_2$—CH$_2$—CH(OH)—CH$_2$—SO$_3$Li | 1 |
| 174 | —CO$_2$—CH$_2$—CH$_2$—CH$_2$—SO$_2$—NH—CH$_2$—CH(OH)—CH$_3$ | 1 |
| 175 | —CO$_2$—CH$_2$—CH$_2$—CH$_2$—CO—N(CH$_2$—CH$_2$—COOLi)(CH$_2$—COOLi) | 1 |

The order in which the substituents as $R_1$ and $R_2$ at the β-positions of the benzene rings are displayed in Table 2 may be reversed. k and l represent an average mixing ratio attributed to the molar ratio of phthalocyanine derivatives used in the synthesis.

TABLE 3

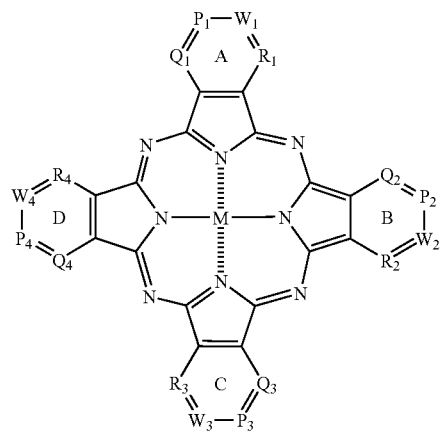

| No. | M | (A) | (B) | (C) | (D) |
|---|---|---|---|---|---|
| C-36 | Cu | H–⌬–SO₂(CH₂)₃SO₃Li (2,3-dimethylphenyl) | H–⌬–SO₂(CH₂)₃SO₃Li (2,3-dimethylphenyl) | H–⌬–SO₂(CH₂)₃SO₃Li (2,3-dimethylphenyl) | 2,3-dimethylpyridine |
| C-37 | Cu | H–⌬–SO₂(CH₂)₃SO₃Li (2,3-dimethylphenyl) | H–⌬–SO₂(CH₂)₃SO₃Li (2,3-dimethylphenyl) | H–⌬–SO₂(CH₂)₃SO₃Li (2,3-dimethylphenyl) | 3,4-dimethylpyridine |
| C-38 | Cu | H–⌬–SO₂(CH₂)₃SO₃Li (2,3-dimethylphenyl) | H–⌬–SO₂(CH₂)₃SO₃Li (2,3-dimethylphenyl) | H–⌬–SO₂(CH₂)₃SO₃Li (2,3-dimethylphenyl) | 2,3-dimethylpyrazine |
| C-39 | Cu | H–⌬–SO₂(CH₂)₃SO₃Li (2,3-dimethylphenyl) | H–⌬–SO₂(CH₂)₃SO₃Li (2,3-dimethylphenyl) | 2,3-dimethylpyridine | 2,3-dimethylpyridine |
| C-40 | Cu | H–⌬–SO₂(CH₂)₃SO₃Li (2,3-dimethylphenyl) | H–⌬–SO₂(CH₂)₃SO₃Li (2,3-dimethylphenyl) | 3,4-dimethylpyridine | 3,4-dimethylpyridine |

TABLE 3-continued
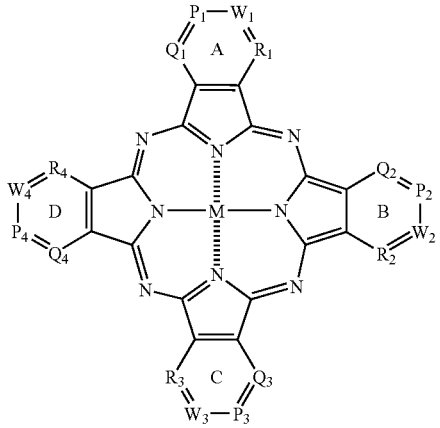
| No. | M | (A) | (B) | (C) | (D) |
|---|---|---|---|---|---|
| C-41 | Cu | 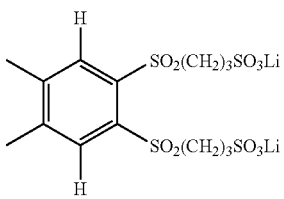 |  |  |  |
| C-42 | Cu | 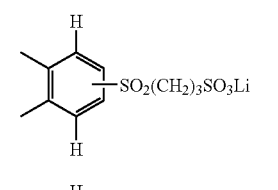 | 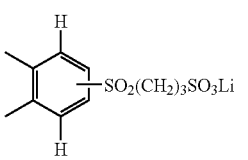 | 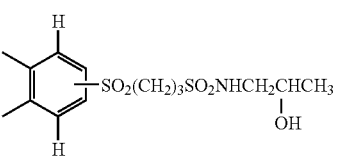 |  |
| C-43 | Cu | 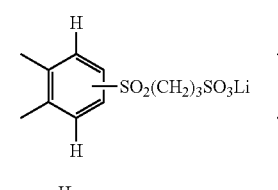 | 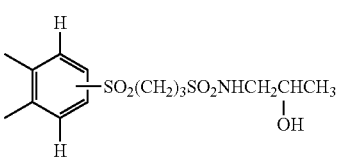 | 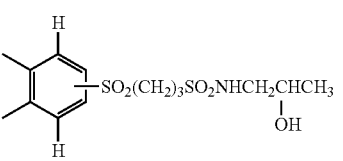 |  |
| C-44 | Ni | 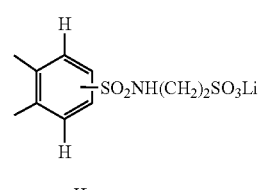 | 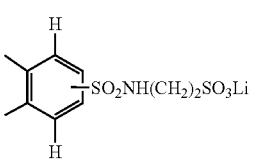 | 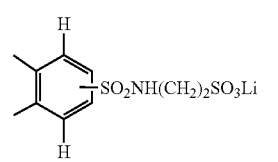 |  |
| C-45 | Cu | 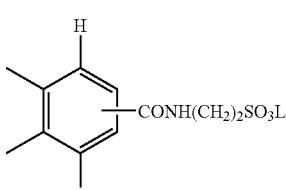 | 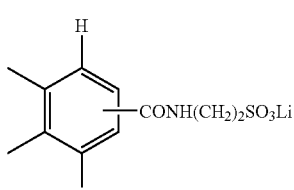 | 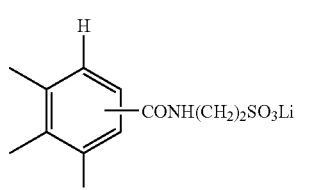 |  |
(A) = 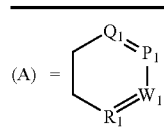
(B) = 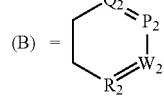

TABLE 3-continued

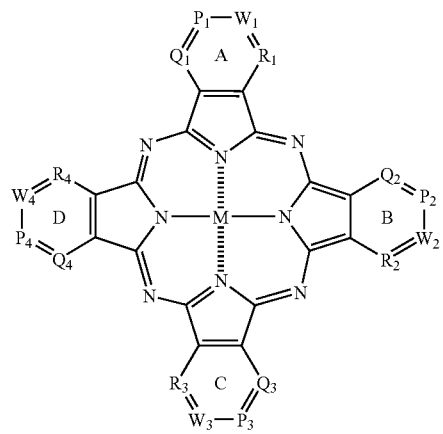

| No. | M | (A) | (B) | (C) | (D) |
|---|---|---|---|---|---|

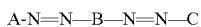

The order in which the rings A to D are displayed in Table 3 be changed arbitrarily. The number of each ring depends on the molar ratio of phthalocyanine derivatives used in the synthesis.

The anthrapyridone colorants that can be used in the invention preferably include the compounds disclosed in WO 03/27185 (JP-A-2003-192930).

The azo colorants that can be used in the invention preferably include those represented by formula (4):

$$A\text{-}N=N\text{-}B\text{-}N=N\text{-}C \quad (4)$$

wherein A, B, and C each represent a substituted or unsubstituted aromatic group (A and C each represent a monovalent aromatic group, such as an aryl group, and B represents a divalent aromatic group, such as an arylene group) or a substituted or unsubstituted heterocyclic group (A and C each represent a monovalent heterocyclic group, and B represents a divalent heterocyclic group).

The aromatic group includes a benzene ring and a naphthalene ring. The hetero atom of the heterocyclic group includes nitrogen, oxygen, and sulfur. The heterocyclic group may be a condensed ring containing an aliphatic, aromatic or heterocyclic ring. The substituents may be an arylazo group or a heterocyclic azo group. It is preferred that at least two of A, B, and C be heterocyclic rings.

The azo colorant of formula (4) may be in the form of a metallized dye.

Preferred azo colorants are described in WO 03/106572A1, WO 03/104332A1, WO 01/62854, WO 00/43450, WO 00/43451, WO 00/43452, WO 00/43453, JP-A-10-130557, JP-A-9-124965, JP-A-6-220377, JP-A-6-234944, and EP 982371.

Of the azo colorants preferred are those represented by formula (5):

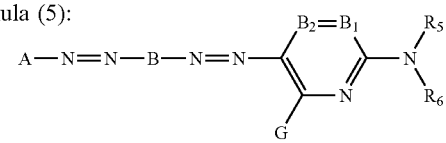

wherein A and B are as defined above; $B_1$ and $B_2$ each represent $=CR_1-$, $-CR_2=$ or a nitrogen atom provided that $B_1=B_2\neq N$; $R_5$ and $R_6$ each represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, each of which may, if possible, have a substituent, provided that $R_5=R_6\neq H$; and G, $R_1$, and $R_2$ each represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (inclusive of an anilino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, each of which may have a substituent if possible.

$B_1$ and $B_2$ each preferably represent $=CR_1-$ or $-CR_2=$.

$R_5$ and $R_6$ each preferably represent a hydrogen atom, an aliphatic group, an aromatic group, a heterocyclic group, an acyl group, an alkylsulfonyl group or an arylsulfonyl group, still preferably a hydrogen atom, an aromatic group, a heterocyclic group, an acyl group, an alkylsulfonyl group or an arylsulfonyl group, particularly preferably a hydrogen atom, an aryl group or a heterocyclic group.

G preferably represents a hydrogen atom, a halogen atom, an aliphatic group, an aromatic group, a hydroxyl group, an alkoxy group, an aryloxy group, an acyloxy group, a heterocyclic oxy group, an amino group (inclusive of an anilino group and a heterocyclic amino group), an acylamino group, a ureido group, a sulfamoylamino group, an alkoxycarbonylamino group, an aryloxycarbonylamino group, an alkylthio group, an arylthio group, or a heterocyclic thio group, still preferably a hydrogen atom, a halogen atom, an alkyl group, a hydroxyl group, an alkoxy group, an aryloxy group, an acyloxy group, an amino group (inclusive of an anilino group and a heterocyclic amino group) or an acylamino group, particularly preferably a hydrogen atom, an anilino group or an acylamino group. Each of these groups may have a substituent.

$R_1$ and $R_2$ each preferably represent a hydrogen atom, an alkyl group, a halogen atom, an alkoxycarbonyl group, a carboxyl group, a carbamoyl group, a hydroxyl group, an alkoxy group or a cyano group, each of which may, if possible, have a substituent.

$R_1$ and $R_5$ may be taken together, or $R_5$ and $R_6$ may be taken together, to form a 5- or 6-membered ring.

The substituents that may be possessed by the groups represented by A, $R_1$, $R_2$, $R_5$, $R_6$, and G include those enumerated above as examples of G, $R_1$, and $R_2$. It is preferred for any of G, $R_1$, $R_2$, $R_5$, $R_6$ to additionally have an ionic hydrophilic substituent at an arbitrary position. Such anionic hydrophilic group includes a sulfo group, a carboxyl group, a phosphono group, and a quaternary ammonium group, with a carboxyl group, a phosphono group, and a sulfo group being preferred. A carboxyl group and a sulfo group are particularly preferred. The carboxyl group, phosphono group and sulfo group may be in the form of a salt with, for example, an ammonium ion, an alkali metal ion (e.g., Li, Na or K ion) or an organic cation (e.g., tetramethylammonium, tetramethylguanidinium or tetramethylphosphonium ion).

The heterocyclic ring represented by B preferably includes a thiophene ring, a thiazole ring, an imidazole ring, a benzothiazole ring, and a thienothiazole ring, each of which may have a substituent. The heterocyclic ring as B still preferably includes a thiophene ring represented by formula (a), a thiazole ring represented by formula (b), an imidazole ring represented by formula (c), a benzothiazole ring represented by formula (d), and a thienothiazole ring represented by formula (e):

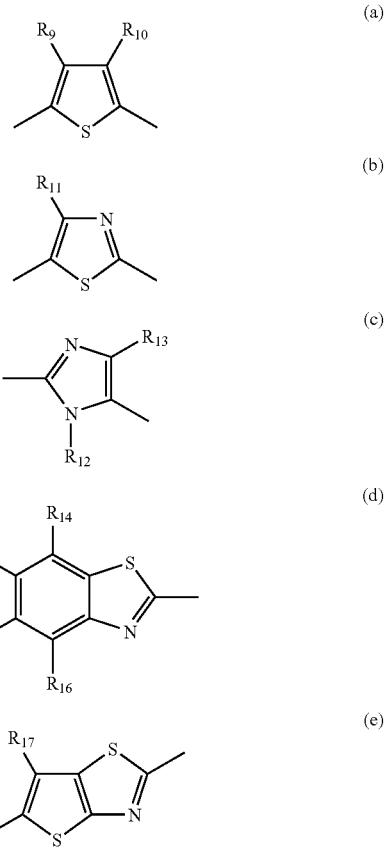

wherein $R_9$, $R_{10}$, $R_{11}$, $R_{12}$, $R_{13}$, $R_{14}$, $R_{15}$, $R_{16}$, and $R_{17}$ each represent a hydrogen atom or any one of the substituents recited as G, $R_1$, and $R_2$ of formula (5).

Preferred azo colorants represented by formula (4) (and formula (5)) are shown below.

TABLE 4

A—N=N—B—N=N—C

| | A | B | C |
|---|---|---|---|
| (a-1) | phenyl | 2,5-dimethylthiophene-3-CN | pyridine with H₃C, CN, two HN-phenyl-SO₃H substituents |

TABLE 4-continued

A—N=N—B—N=N—C

| | A | B | C |
|---|---|---|---|
| (a-2) | 2-methylphenyl (CH₃) | 2,5-dimethyl-3-cyanothiophene | (structure) |
| (a-3) | 2-chlorophenyl | 2,5-dimethyl-3-cyanothiophene | (structure) |
| (a-4) | 4-cyanophenyl | 2,5-dimethyl-3-cyanothiophene | (structure) |
| (a-5) | 4-nitrophenyl | 2,5-dimethyl-3-cyanothiophene | (structure) |
| (a-6) | 3-pyridyl | 2,5-dimethyl-3-cyanothiophene | (structure) |

TABLE 4-continued
A—N=N—B—N=N—C
| | A | B | C |
|---|---|---|---|
| (b-1) | | | |
| (b-2) | | | |
| (b-3) | | | |
| (b-4) | | | |
| (b-5) | | | |
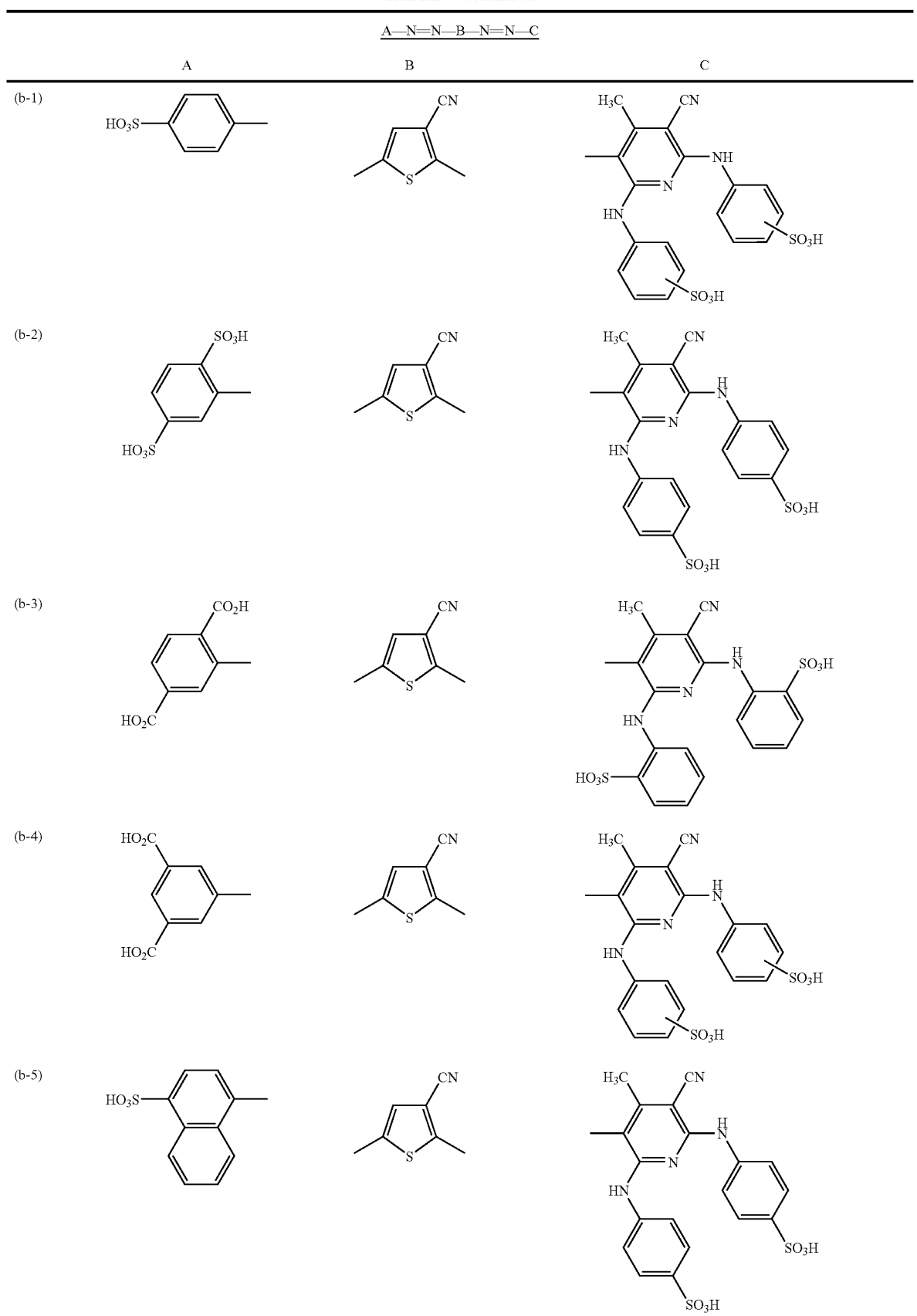

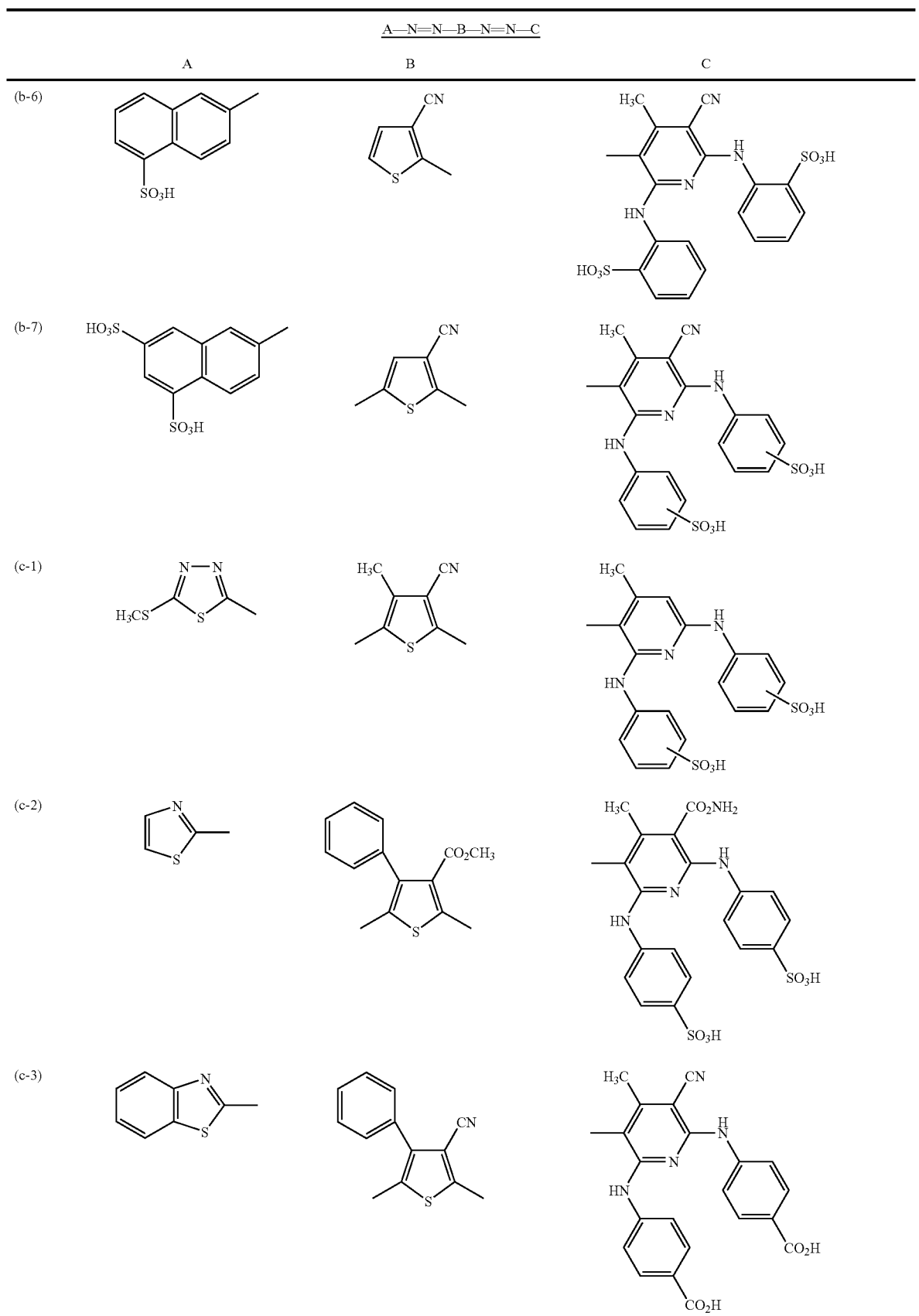

TABLE 4-continued

A—N=N—B—N=N—C

| | A | B | C |
|---|---|---|---|
| (c-4) | 3-methylphenyl with H₂O₃P substituent | methyl 2,5-dimethylthiophene-3-carboxylate | 4-methylpyridine with two NH-phenyl-CO₂H substituents |
| (c-5) | phenyl-N=N-p-tolyl | 2,5-dimethylthiophene-3-carbonitrile | 3,4-dimethylpyridine with two NH-(2-sulfophenyl) substituents |
| (d-1) | 3-sulfophenyl (HO₃S) | 2,5-dimethylthiazole | dimethylpyridine with N(benzothiazole-SO₃H)(phenyl-SO₃H) and NH-phenyl-SO₃H substituents |
| (d-2) | 4-carboxyphenyl (HO₂C) | 2,5-dimethylthiazole | 4-methyl-3-cyano-dimethylpyridine with NH-phenyl-SO₃H substituents |
| (d-3) | 4-carboxyphenyl (HO₂C) | 2,5-dimethyl-4-phenylthiazole | 4-methyl-3-cyano-dimethylpyridine with NH-phenyl-SO₃H substituents |

TABLE 4-continued

A—N=N—B—N=N—C

| | A | B | C |
|---|---|---|---|
| (d-4) | | | |
| (d-5) | | | |
| (d-6) | | | |
| (e-1) | | | |
| (e-2) | | | |

TABLE 4-continued
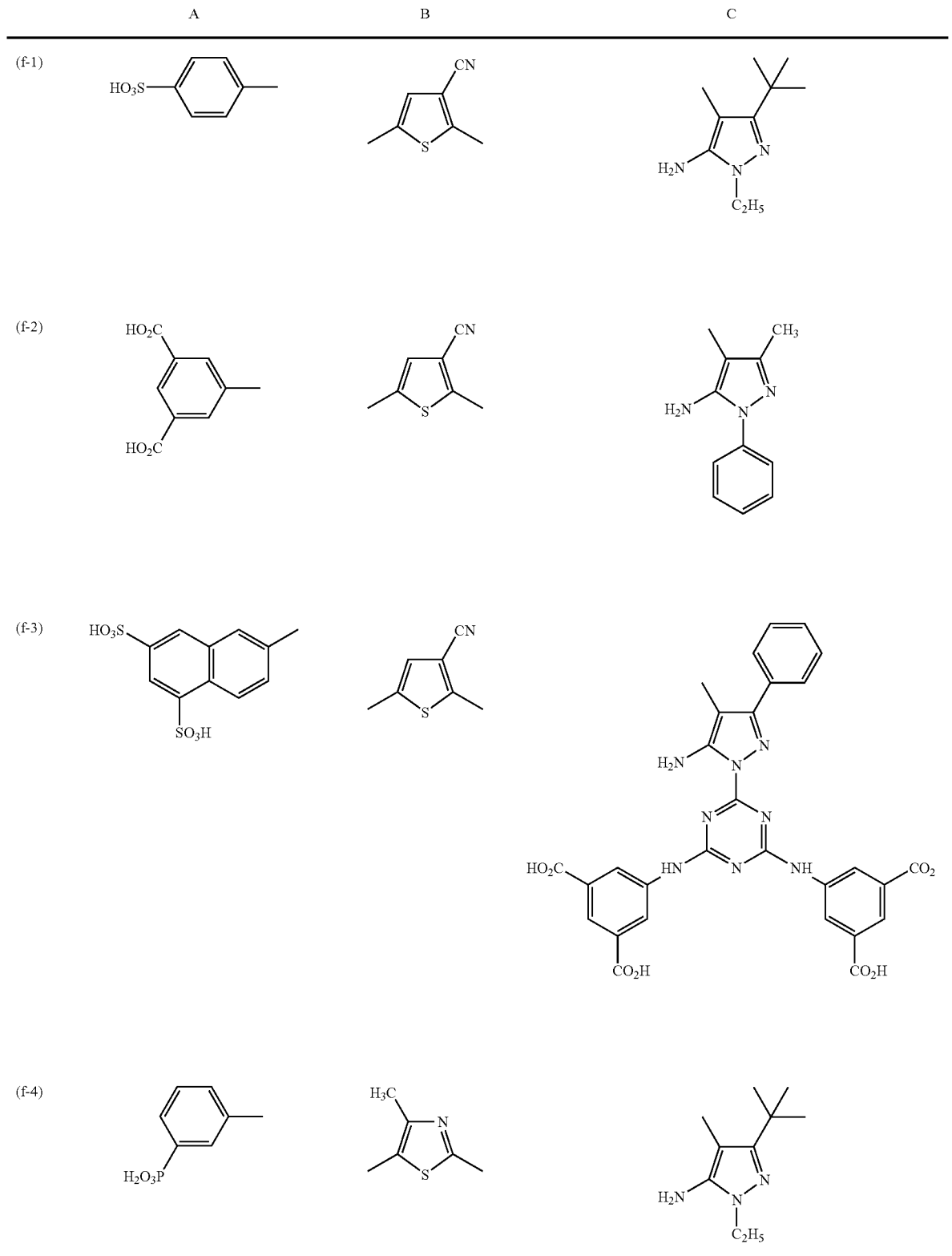

TABLE 5

A—N=N—B—N=N—C

| | A | B | C |
|---|---|---|---|
| (h-1) | 3-methyl-naphthalene-1,5-disulfonic acid | 4-tert-butyl-2,5-dimethyl-3-cyanothiophene | 4-methyl-3-cyano-5-methyl-2,6-bis[(4-sulfophenyl)amino]pyridine |
| (h-2) | 3-methyl-naphthalene-1,5-disulfonic acid | 4-phenyl-2,5-dimethyl-3-cyanothiophene | 4-methyl-3-cyano-5-methyl-2,6-bis[(4-sulfophenyl)amino]pyridine |
| (h-3) | 3-methyl-naphthalene-1,5-disulfonic acid | 4-(2-naphthyl)-2,5-dimethyl-3-cyanothiophene | 4-methyl-3-cyano-5-methyl-2,6-bis[(4-sulfophenyl)amino]pyridine |
| (h-4) | 3-methyl-naphthalene-1,5-disulfonic acid | 4-(4-methoxyphenyl)-2,5-dimethyl-3-cyanothiophene | 4-methyl-3-cyano-5-methyl-2,6-bis[(4-sulfophenyl)amino]pyridine |

TABLE 5-continued

| | A | B | C |
|---|---|---|---|
| (h-5) | | | |
| (h-6) | | | |
| (i-1) | | | |
| (i-2) | | | |

A—N=N—B—N=N—C

TABLE 5-continued

| | A | B | C |
|---|---|---|---|
| (i-3) | | | |
| (i-4) | | | |
| (i-5) | | | |
| (i-6) | | | |

TABLE 5-continued

A—N=N—B—N=N—C

| | A | B | C |
|---|---|---|---|
| (k-1) | | | |
| (k-2) | | | |
| (k-3) | | | |
| (k-4) | | | |

TABLE 5-continued

A—N=N—B—N=N—C

| | A | B | C |
|---|---|---|---|
| (k-5) | | | |
| (k-6) | | | |
| (l-1) | | | |
| (l-2) | | | |

TABLE 5-continued
A—N=N—B—N=N—C
| | A | B | C |
|---|---|---|---|
| (I-3) | 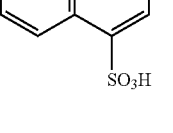 | 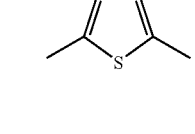 | 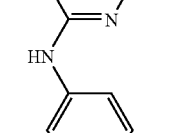 |
| (I-4) | 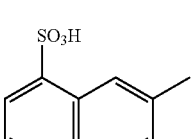 | 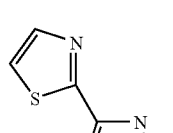 | 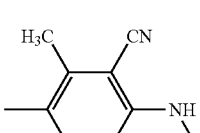 |
| (I-5) |  | 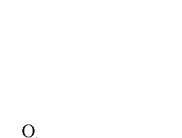 | 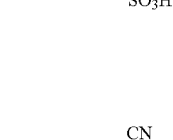 |
| (I-6) |  | 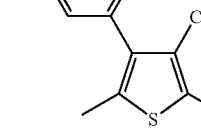 | 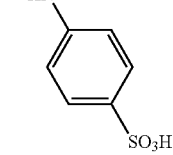 |

The ink-jet ink of the invention is prepared by dissolving or dispersing the above-described colorant in a lipophilic or aqueous medium, preferably an aqueous medium. The ink can contain additives according to necessity provided that the effects of the invention are not affected. Useful additives include anti-drying agents (wetting agents), anti-browning agents, emulsion stabilizers, penetrants, ultraviolet absorbers, antiseptics, antifungals, pH adjustors, surface tension modifiers, defoaming agents, viscosity modifiers, dispersants, dispersion stabilizers, anti-corrosive agents, and chelating agents. The additives can be added directly to a water-soluble ink formulation. Where an oil-soluble colorant is used in the form of a dispersion, the additives are usually added to the prepared colorant dispersion but may be added to either an oily phase or an aqueous phase before the dispersing operation.

Anti-drying agents are added to prevent clogging of ink jet nozzles of a recording head in an ink jet printer due to ink drying. Water-soluble organic solvents having a lower vapor pressure than water are suitable anti-drying agents. Examples of water-soluble organic solvents useful as an anti-drying agent include polyhydric alcohols, such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerol, and trimethylolpropane; lower alkyl ethers of polyhydric alcohols, such as ethylene glycol monomethyl (or ethyl) ether, diethylene glycol monomethyl(or ethyl) ether, and triethylene glycol monoethyl(or butyl) ether; heterocyclic compounds, such as 2-pyrrolidine, N-methyl-2-pyrrolidone, 1,3-dimethyl-2-imidazolidinone, and N-ethylmorpholine; sulfur-containing compounds, such as sulfolane, dimethyl sulfoxide, and 3-sulfolene; polyfunctional compounds, such as diacetone alcohol and diethanolamine; and urea derivatives. Preferred of them are polyhydric alcohols, such as glycerol and diethylene glycol. These anti-drying agents can be used either individually or as a mixture thereof. A suitable amount of the anti-drying agent in an ink formulation is 10 to 50% by weight.

Penetrants are used to accelerate ink penetration into paper. Suitable penetrants include alcohols, such as ethanol, isopropyl alcohol, butanol, di(or tri)ethylene glycol monobutyl ether, and 1,2-hexanediol; sodium laurylsulfate, sodium oleate; and nonionic surface active agents. They generally develop sufficient effects when added to ink formulations in amounts from 5 to 30% by weight, from which range an appropriate amount of addition is selected so as not to cause feathering or print-through.

Ultraviolet absorbers are used to improve image stability against light. Useful ultraviolet absorbers include benzotriazole compounds such as those described in JP-A-58-185677, JP-A-61-190537, JP-A-2-782, JP-A-5-197075, and JP-A-9-34057; benzophenone compounds such as those described in JP-A-46-2784, JP-A-5-194483, and U.S. Pat. No. 3,214,463; cinnamic acid compounds such as those described in JP-B-48-30492, JP-B-56-21141, and JP-A-10-88106; triazine compounds such as those described in JP-A-4-298503, JP-A-8-53427, JP-A-8-239368, JP-A-10-182621, and JP-T-8-501291; and the compounds disclosed in Research Disclosure No. 24239. Compounds that absorb ultraviolet light to emit fluorescence, namely fluorescent whitening agents, typified by stilbene compounds and benzoxazole compounds, are also usable.

Anti-browning agents are used to improve image preservability. Useful anti-browning agents include organic ones and metal complex ones. The organic anti-browning agents include hydroquinones, alkoxyphenols, dialkoxyphenols, phenols, anilines, amines, indanes, chromans, alkoxyanilines, and heterocyclic compounds. The metal complex anti-browning agents include nickel complexes and zinc complexes. Specific examples of useful anti-browning agents are given in patents referred to in Research Disclosure No. 17643, VII-I to -J, ibid No. 15162, ibid No. 18716, p. 650, left col., ibid No. 36544, p. 527, ibid No. 307105, p. 872, and ibid No. 15162 and JP-A-62-215272, pp. 127-137.

Antifungals that can be used include sodium dehydroacetate, sodium benzoate, sodium pyridinethione-1-oxide, ethyl p-hydroxybenzoate, and 1,2-benzisothiazolin-3-one and its salts. The antifungal is preferably added to an ink formulation in an amount of 0.02 to 1.00% by weight.

Neutralizing agents, such as organic bases and inorganic alkalis, can be used as a pH adjustor. For the purpose of improving storage stability of ink-jet inks, a pH adjustor is preferably added to adjust an ink formulation to a pH of 6 to 10, still preferably 7 to 10, taking use in summer into consideration.

Surface tension modifiers that can be used in the invention include nonionic, cationic or anionic surface active agents. Ink-jet inks preferably have a surface tension of 25 to 70 mPa·s, still preferably 25 to 60 mPa·s, and a viscosity of 30 mPa·s or less, still preferably 20 mPa·s or less. Examples of suitable anionic surface active agents are fatty acid salts, alkylsulfates, alkylbenzenesulfonates, alkylnaphthalenesulfonates, dialkyl sulfosuccinates, alkylphosphates, naphthalenesulfonic acid-formalin condensates, and polyethylene glycol alkylsulfates. Examples of suitable nonionic surface active agents are polyethylene glycol alkyl ethers, polyethylene glycol alkyl allyl ethers, polyethylene glycol fatty acid esters, sorbitan fatty acid esters, polyoxyethylene sorbitan fatty acid esters, polyoxyethylene alkylamines, glycerol fatty acid esters, and ethylene oxide/propylene oxide block copolymers. A series of acetylenic polyethylene oxide surfactants available from Air Products & Chemicals, Inc. under the trade name Surfynol are also preferably used. Amphoteric surface active agents of amine oxide type, such as N,N-dimethyl-N-alkylamine oxides, are preferred as well. Additionally the surface active agents described in JP-A-59-157636, pp. 37-38 and Research Disclosure No. 308119 (1989) are also useful.

Defoaming agents that can be used if needed include fluorine-containing compounds, silicone compounds, and chelating agents typified by ethylenediaminetetraacetic acid.

In preparing a water-borne ink, the colorant is preferably dispersed in an aqueous medium by the technique of JP-A-11-286637, JP-A-2001-240763, JP-A-2001-262039, and JP-A-2001-247788, in which fine colored particles containing a colorant and an oil-soluble polymer are dispersed in an aqueous medium, or the technique of JP-A-2001-262018, JP-A-2001-240763, JP-A-2001-335734, and JP-A-2002-80772, in which a colorant dissolved in a high-boiling organic solvent is dispersed in an aqueous medium. The procedure for dispersing a colorant in an aqueous medium and the kind and amount of the oil soluble polymer, the high boiling organic solvent, and additives to be used in carrying out these techniques are preferably selected in accordance with the teachings of the above-cited patent specifications. A solid colorant could be finely dispersed as such. A dispersant or a surface active agent can be utilized in dispersing. Dispersing machines that can be used include simple stirrers or impellers, in-line stirring systems, mills (e.g., colloid mill, ball mill, sand mill, attritor, roll mill, agitator mill), ultrasonic dispersing machines, and high-pressure emulsifying or dispersing machines, i.e., high-pressure homogenizers (e.g., Gaulin Homogenizer, Microfluidizer, DeBEE 2000). Methods and materials useful to prepare the ink of the invention are also taught in JP-A-5-148436, JP-A-5-295312, JP-A-7-97541, JP-A-7-82515, JP-A-7-118584, JP-A-11-286637, and JP-A-2001-271003.

The aqueous medium includes water and a mixture of water and a minor proportion of a water-miscible organic solvent. The water-miscible organic solvent includes alcohols (e.g., methanol, ethanol, propanol, isopropyl alcohol, butanol, isobutanol, sec-butanol, tert-butanol, pentanol, hexanol, cyclohexanol, and benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerol, hexanetriol, and thiodiglyol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). The water-miscible organic solvents can be used either individually or as a combination thereof.

The ink-jet ink of the present invention preferably contains at least one colorant in a total amount of 0.2 to 10 parts by weight per 100 parts by weight of the total ink formulation.

The ink is applicable to not only monochromatic but full-color image formation. In full color applications, a magenta ink, a cyan ink, and a yellow ink are used in combination. A black ink can also be used for toning. Yellow, magenta, and cyan colorants to be used in these ink formulations are arbitrarily selected. The ink can contain other colorants in addition to the phthalocyanine compound of the invention to have improved image reproducibility.

Suitable yellow colorants includes aryl- or heterylazo dyes having, as a coupler component, phenols, naphthols, anilines, hetero rings (e.g., pyrazolone and pyridone), open-chain active methylene compounds, and the like; azomethine dyes having open-chain active methylene compounds as a coupler component; methine dyes, such as benzylidene dyes and monomethine oxonol dyes; and quinone dyes, such as naphthoquinone dyes and anthraquinone dyes. In addition, quinophthalone dyes, nitro dyes, nitroso dyes, acridine dyes, and acridinone dyes are also useful.

Suitable magenta colorants include aryl- or heterylazo dyes having, as a coupler component, phenols, naphthols or anilines; azomethine dyes having pyrazolones or pyrazolotriazoles as a coupler component; methine dyes, such as arylidene dyes, styryl dyes, merocyanine dyes, cyanine dyes, and oxonol dyes; carbonium dyes, such as diphenylmethane dyes, triphenylmethane dyes, and xanthene dyes; quinone dyes, such as naphthoquinone dyes, anthraquinone dyes, and anthrapyridone dyes; and condensed polycyclic dyes, such as dioxazine dyes.

Suitable cyan colorants include aryl- or heterylazo dyes having, as a coupler component, phenols, naphthols, anilines, etc.; azomethine dyes having, as a coupler component, phenols, naphthols, hetero rings (e.g., pyrrolotriazole), etc.; polymethine dyes, such as cyanine dyes, oxonol dyes, and merocyanine dyes; carbonium dyes, such as diphenylmethane dyes, triphenylmethane dyes, and xanthene dyes; phthalocyanine dyes; anthraquinone dyes; indigo dyes; and thioindigo dyes.

Yellow, magenta or cyan colorants which do not develop a color until part of their chromophore is dissociated are also useful. Counter cations in this type of dyes include inorganic ones such as alkali metals and ammonium, organic ones such as pyridinium and a quaternary ammonium salt, and polymeric ones having such a cation as a partial structure.

Black colorants that can be used include disazo dyes, triazo dyes, tetraazo dyes, and a carbon black dispersion.

The ink jet recording method according to the present invention comprises applying energy to the above-described ink-jet ink of the invention to form an image on known image receiving media, such as plain paper, resin coated paper, dedicated paper described, e.g., in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, and JP-A-10-337947, films, paper for both ink jet printing and electrophotography, fabric, glass, metal, and earthenware.

In order to impart gloss, water resistance or improved weather resistance to an image, a polymer latex compound can be used in image forming. The latex compound may be supplied to the image receiving medium before, after or simultaneously with ink application. In other words, the polymer latex compound may be incorporated into either the image receiving medium or the ink or may be used alone in the form of liquid. Specifically, the methods proposed in JP-A-2002-166638, JP-A-2002-121440, JP-A-2002-154201, JP-A-2002-144696, JP-A-2002-80759, JP-A-2002-187342, and JP-A-2002-172774 can be followed.

Recording paper or film as an image receiving medium that can be printed on an ink jet printer with the ink of the present invention usually comprises a substrate and an ink-receiving layer, and, if desired, a backcoating layer.

The substrate of recording paper or film includes paper, synthetic paper, plastic films or sheets. The paper substrate is made of chemical pulp, e.g., Laubholz bleached kraft pulp (LBKP) and Nadelholz bleached kraft pulp (NBKP), mechanical pulp, e.g., ground pulp (GP), pressurized ground wood pulp (PGW), refiner mechanical pulp (RMP), thermochemical pulp (TMP), chemi-thermo-mechanical pulp (CTMP), chemi-mechanical pulp (CMP), and chemi-ground pulp (CGP), and used paper pulp, e.g., deinked pulp (DIP), and the like. The paper substrate is produced from a pulp slurry that can contain, according to necessity, pigments, binders, and known additives, such as sizes, fixatives, cationic agents, paper strengthening agents, and so forth by using a Fourdrinier paper machine, a cylinder paper machine, etc. The substrate preferably has a thickness of 10 to 250 μm and a basis weight of 10 to 250 g/m². An ink receiving layer and a backcoating layer may be provided on the substrate either directly or via a size press coating of starch, polyvinyl alcohol, etc. or an anchor coating. The substrate may be subjected to flattening treatment with a calendering machine, such as a machine calender, a temperature-gradient calender or a soft nip calender. Substrates suitable for printing with the ink of the invention include paper laminated on both sides with a polyolefin (e.g., polyethylene), polystyrene, polyethylene terephthalate, polybutene, or a copolymer comprising monomer units of these homopolymers, and plastic films. It is preferred to add to the laminating polyolefin a white pigment (e.g., titanium oxide or zinc oxide) or a tinting dye (e.g., Cobalt Blue, ultramarine, or neodymium oxide).

The ink receiving layer that can be provided on the substrate is formed of a pigment and an aqueous binder. The pigment is preferably a white pigment, including inorganic ones, such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate; and organic ones, such as styrene pigments, acrylic pigments, urea resins, and melamine resins. Inorganic porous white pigments are preferred. Synthetic amorphous silica having a large pore surface area is particularly suited. While both silicic anhydride obtained by a dry process and hydrous silicic acid obtained by a wet process are usable, hydrous silicic acid is desirable.

The aqueous binder used in the ink receiving layer includes water-soluble polymers, such as polyvinyl alcohol, silanol-modified polyvinyl alcohol, starch, cationic starch, casein, gelatin, carboxymethyl cellulose, hydroxyethyl cellulose, polyvinylpyrrolidone, polyalkylene oxide, and polyalkylene oxide derivatives; and water-dispersible polymers, such as styrene-butadiene latices and acrylic emulsions. These aqueous binders can be used either individually or as a mixture of two or more thereof. Preferred of them are polyvinyl alcohol and silanol-modified polyvinyl alcohol in view of their adhesion to pigment particles and capability of forming a peel resistant coat.

The ink receiving layer can further contain mordants, waterproofing agents, light fastness improvers, surface active agents, and other additives in addition to the pigment and aqueous binder.

The mordant to be added to the ink receiving layer is preferably immobilized. In that regard, polymeric mordants are preferably used. Polymeric mordants are described in JP-A-48-28325, JP-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, and U.S. Pat. Nos. 2,484,430, 2,548,564, 3,148,061, 3,309,690, 4,115,124, 4,124,386, 4,193,800, 4,273,853, 4,282,305, and 4,450,224. Image receiving materials containing the polymeric mordants disclosed in JP-A-1-161236, pp. 212-215 are particularly preferred. The polymeric mordants of JP-A-1-161236 are effective to form images with high print quality and improved light fastness.

Waterproofing agents are effective to render images waterproof. Cationic resins are preferred waterproofing agents. Examples of suitable cationic resins are polyamide-polyamine-epichlorohydrin, polyethylene-imine, polyamine sulfone, dimethyldiallylammonium chloride polymer, cationic polyacrylamide, and colloidal silica. Polyamide-polyamine-epichlorohydrin is particularly suited. The cationic resin is preferably used in an amount of 1 to 15% by weight, still preferably 3 to 10% by weight, based on the total solids content of the ink receiving layer.

Light fastness improvers include zinc sulfate, zinc oxide, hindered amine antioxidants, and benzophenone or benzotriazole ultraviolet absorbers. Zinc sulfate is particularly suitable.

Surface active agents in the image receiving layer function as a coating aid, a peeling resistance improver, a slip improver or an antistatic agent. Useful surface active agents are described in JP-A-62-173463 and JP-A-62-183457. Organic fluorine compounds may be used in place of the surface active agents. Hydrophobic organic fluorine compounds are preferred. The organic fluorine compounds include fluorine surface active agents, oily fluorine compounds (e.g., fluorine oil), and solid fluorine compounds (e.g., tetrafluoroethylene resin). Details of the organic fluorine compounds are described in JP-B-57-9053 (cols. 8-17), JP-A-61-20994 and JP-A-62-135826. Other additives that can be added to the ink-receiving layer include pigment dispersants, thickeners, defoaming agents, dyes, fluorescent whitening agents, antiseptics, pH adjustors, matting agents, and hardeners. The ink-receiving layer can have a single or double layer structure.

The backcoating layer, which can be provided if desired, is formed of a white pigment, an aqueous binder, and additives. The white pigment includes inorganic ones such as light precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate, and magnesium hydroxide; and organic ones such as styrene plastic pigments, acrylic plastic pigments, polyethylene, hollow particles, urea resins, and melamine resins.

Aqueous binders which can be used in the backcoating layer include water-soluble polymers such as styrene/maleic acid salt copolymers, styrene/acrylic acid salt copolymers, polyvinyl alcohol, silanol-modified polyvinyl alcohol, starch, cationic starch, casein, gelatin, carboxymethyl cellulose, hydroxyethyl cellulose, and polyvinylpyrrolidone; and water-dispersible polymers such as styrene-butadiene latices and acrylic emulsions. Additives that can be used in the back coating layer include defoaming agents, foam-suppressors, dyes, fluorescent whitening agents, antiseptics, and waterproofing agents.

A polymer latex may be incorporated into any layer constituting the paper or film for ink-jet recording inclusive of the backcoating layer for the purpose of improving film properties, for example, dimensional stabilization, curling prevention, anti-blocking, and crack prevention. For the details refer to JP-A-62-245258, JP-A-62-136648, and JP-A-62-110066. Addition of a polymer latex having a low glass transition temperature (40° C. or lower) into a layer containing a mordant will prevent cracking or curling. Addition of a polymer latex having a high glass transition temperature to a backcoating layer is also effective for curling prevention.

The ink-jet ink according to the present invention is applicable to any known ink jet recording systems, such as an electrostatic system in which ink droplets are ejected by an electrostatic attracting force, a drop-on-demand system in which vibrating pressure by a piezoelectric element is utilized (pressure pulse system), an acoustic system in which electrical signals are converted to an acoustic beam, which is applied to ink, and ink is ejected by making use of a radiating pressure, and a thermal system in which vapor bubbles are generated by heat to eject ink droplets. Ink jet recording includes a system in which a number of fine droplets of low concentration ink called photoink are ejected, a system in which a plurality of ink formulations having substantially the same hue but different concentrations are used to improve image quality, and a system of using colorless transparent ink.

EXAMPLES

The present invention will now be illustrated in greater detail with reference to Examples, but it should be understood that the invention is not deemed to be limited thereto.

Example 1

The components of the following formulation were mixed, and super pure water having a resistivity of 18 MΩ or higher was added to make one liter. The mixture was heated at 30° to 40° C. for 1 hour while stirring, followed by filtration under pressure through a microfilter with an average pore size of 0.25 μm to prepare a light cyan ink composition, designated LC-101.

Formulation of Light Cyan Ink LC-101:

| Solid components: | |
|---|---|
| Cyan dye (154) | 17.5 g/l |
| Proxel XL-2 (available from AVICIA) | 3.5 g/l |
| Liquid components: | |
| Diethylene glycol | 150 g/l |
| Glycerol | 130 g/l |
| Triethylene glycol monobutyl ether | 130 g/l |
| Triethanolamine | 6.9 g/l |
| Surfynol STG (available from AIRPRODUCTS) | 10 g/l |

A cyan ink composition, designated C-101, was prepared in the same manner as for the light cyan ink composition LC-101, except for increasing the amount of the cyan dye to 60 g/l.

To the cyan ink composition C-101 was added an additive, such as a water-soluble planar compound serving as a deflocculant, as shown in Table 6 to prepare cyan ink Nos. 1 to 10.

TABLE 6

| Ink No. | Additive | Amount (g/l) | Remark |
|---|---|---|---|
| 1 | none | — | comparison |
| 2 | urea | 15 | " |
| 3 | sodium quinolinate | 15 | " |
| 4 | taurine | 15 | " |
| 5 | P-1 (deflocculant) | 15 | invention |
| 6 | P-2 (deflocculant) | 15 | " |
| 7 | P-4 (deflocculant) | 15 | " |
| 8 | P-6 (deflocculant) | 15 | " |
| 9 | P-7 (deflocculant) | 15 | " |
| 10 | P-9 (deflocculant) | 15 | " |

An ink jet printer PM-980C from Seiko Epson Corp. was used. Ink jet printing was carried out first with a set of the genuine ink cartridges for the printer and then with the genuine cyan and light cyan ink cartridges being replaced with cartridges of each of the above-prepared cyan inks (Nos. 1 to 10) and the light cyan ink LC-101, respectively. A monochromatic cyan image having a density increasing in 11 steps from 0.2 to 2.2 was printed on ink-jet paper Photo Gloss Paper "Gasai" from Fuji Photo Film Co., Ltd. and Inkjet Paper "QP" Photo Glossy from Konica Corp. The resulting prints were evaluated for image quality and fastness as follows. The results obtained are shown in Table 7.

1) Image Quality

The images printed in an environment of 30° C. and 80% RH were inspected for bronzing and rated according to the following system.

A: No bronzing up to the highest density.
B: Bronzing in areas from the lowest density to the 8th to 11th steps.
C: Bronzing in areas from the lowest density to the 7th step.

2) Image Preservability

The images printed on Photo Gloss Paper "Gasai" were subjected to the following fastness tests. Points of measurement were chosen from the image area having a reflection density between 0.9 and 1.1.

2-1) Light Fastness

The image density immediately after printing (Ci) was measured with a densitometer X-Rite 310. The image was irradiated with xenon light (85,000 lux) for 10 days in an Atlas weatherometer, and the density (Cf) was measured again. Dye retention (Cf/Ci×100%) was calculated at three points whose densities before exposure (Ci) were 1, 1.5, and 2.0. An image having a dye retention of 70% or higher at every measuring point was graded A. An image having a dye retention lower than 70% at one or two out of three points was graded B. An image having a dye retention lower than 70% at every point was graded C.

2-2) Heat Fastness

The print was allowed to stand at 80° C. and 15% RH for ten days. The image density was measured before and after the heat exposure with a reflection densitometer X-Rite 310. Dye retention (%) was calculated at three points whose densities before heat exposure were 1, 1.5, and 2.0. An image having a dye retention of 90% or higher at every measuring point was graded A. An image having a dye retention lower than 90% at one or two out of three points was graded B. An image having a dye retention lower than 90% at every point was graded C.

2-3) Ozone Fastness

The print was left to stand in a chamber having an ozone gas concentration of 0.5 ppm for seven days. A dye retention after exposure to ozone was obtained on three measuring points in the same manner as for evaluation of light and heat fastness. The ozone concentration in the chamber was set with an ozone gas monitor (OZG-EM-01, available from Applics Co., Ltd.). An image having a dye retention of 80% or higher at every measuring point was graded A. An image having a dye retention lower than 80% at one or two out of three points was graded B. An image having a dye retention lower than 80% at every point was graded C.

TABLE 7

| Cyan Ink No. | Bronzing | | Light Fastness | Heat Fastness | Ozone Fastness |
| | Gasai | QP | | | |
|---|---|---|---|---|---|
| genuine ink for PM-980C | A | B | B | B | C |
| 1 | B | C | A | A | A |
| 2 | B | C | A | A | A |
| 3 | B | C | A | A | A |
| 4 | B | C | A | A | A |

TABLE 7-continued

| Cyan Ink No. | Bronzing | | Light Fastness | Heat Fastness | Ozone Fastness |
| --- | --- | --- | --- | --- | --- |
| | Gasai | QP | | | |
| 5 | A | A | A | A | A |
| 6 | A | A | A | A | A |
| 7 | A | A | A | A | A |
| 8 | A | A | A | A | A |
| 9 | A | A | A | A | A |
| 10 | A | A | A | A | A |

It is apparent from the results in Table 7 that the images formed of the cyan ink compositions containing the water-soluble planar compound as a deflocculant do not suffer from bronzing and are superior to comparative images in image quality and transparency.

It was also confirmed that combinations of the water-soluble planar compound with other ink colorants of yellow, magenta and black colors (e.g., azo dyes or polyazo dyes) produce the same effects.

This application is based on Japanese Patent application JP 2003-316792, filed Sep. 9, 2003, the entire content of which is hereby incorporated by reference, the same as if set forth at length.

What is claimed is:

1. An ink-jet ink containing a colorless, water-soluble, planar compound having more than ten delocalized pi-electrons per molecule, wherein the compound comprises two or more triazine rings per molecule.

2. The ink-jet ink according to claim 1 which contains a colorant selected from a phthalocyanine colorant, an anthrapyridone colorant, a monoazo colorant, a disazo colorant, a trisazo colorant, and a tetrakisazo colorant.

3. The ink-jet ink according to claim 1, wherein the water-soluble planar compound is a non-fluorescent compound having an absorption peak at a wavelength of 350 nm or shorter and a molar absorptivity of 10,000 or less.

4. The ink-jet ink according to claim 1, wherein the water-soluble planar compound is a non-fluorescent compound having an absorption peak at a wavelength of 320 nm or shorter and a molar absorptivity of 10,000 or less.

5. The ink-jet ink according to claim 1, wherein the water-soluble planar compound has a sulfo group.

6. An ink jet recording method comprising forming an image with the ink-jet ink according to claim 1.

7. A method for reducing bronzing in ink jet recording comprising forming an image with an ink-jet ink comprising a colorless, water-soluble, planar compound having more than ten delocalized pi-electrons per molecule, wherein the compound comprises two or more triazine rings per molecule.

* * * * *